United States Patent
Yamaura et al.

(10) Patent No.: US 11,693,681 B2
(45) Date of Patent: Jul. 4, 2023

(54) PROCESSING APPARATUS, PROCESSING METHOD, AND COMPUTER PROGRAM PRODUCT FOR CONTROLLING TIMING OF DATA ACCESSING TO A MEMORY

(71) Applicant: KABUSHIKI KAISHA TOSHIBA, Minato-ku (JP)

(72) Inventors: Takahiro Yamaura, Kawasaki (JP); Yasin Oge, Sagamihara (JP); Yuta Kobayashi, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 155 days.

(21) Appl. No.: 16/553,976

(22) Filed: Aug. 28, 2019

(65) Prior Publication Data

US 2020/0293353 A1    Sep. 17, 2020

(30) Foreign Application Priority Data

Mar. 15, 2019    (JP) .............................. JP2019-047969

(51) Int. Cl.
*G06F 9/455* (2018.01)

(52) U.S. Cl.
CPC ...... *G06F 9/45558* (2013.01); *G06F 9/45504* (2013.01); *G06F 2009/45583* (2013.01); *G06F 2009/45587* (2013.01); *G06F 2009/45595* (2013.01)

(58) Field of Classification Search
CPC ............. G06F 9/45558; G06F 9/45504; G06F 2009/45583; G06F 2009/45587; G06F 2009/45595
See application file for complete search history.

(56) References Cited

U.S. PATENT DOCUMENTS

| 6,182,197 B1 | 1/2001 | Dias et al. |
| 8,151,265 B2* | 4/2012 | Ben-Yehuda ........... G06F 9/545 718/1 |
| 8,245,229 B2* | 8/2012 | Green .................. G06F 9/5083 718/101 |

(Continued)

FOREIGN PATENT DOCUMENTS

| JP | 2013-061857 A | 4/2013 |
| JP | 2016-045563 A | 4/2016 |

(Continued)

OTHER PUBLICATIONS

Yun, H, et al. "MemGuard: Memory bandwidth reservation system for efficient performance isolation in multi-core platforms." DOI: 10. 1109/RTAS. 2013. 6531079, 10 Pages.

(Continued)

*Primary Examiner* — Jacob D Dascomb
(74) *Attorney, Agent, or Firm* — Oblon, McClelland Maier & Neustadt, L.L.P.

(57) ABSTRACT

According to an embodiment, a processing apparatus includes a memory and a processor coupled to the memory. The processor is configured to: execute data access that is at least one of data writing to the memory and data reading from the memory; receive access control information for controlling timing of the data access to be executed; and control the timing of the data access based on the received access control information.

15 Claims, 22 Drawing Sheets

(56) References Cited

U.S. PATENT DOCUMENTS

| | | | |
|---|---|---|---|
| 2002/0112131 A1* | 8/2002 | Fong | G06F 9/325 |
| | | | 711/141 |
| 2016/0048405 A1* | 2/2016 | Lang | G06F 9/45558 |
| | | | 718/1 |
| 2016/0112182 A1* | 4/2016 | Karnes | H04L 7/0008 |
| | | | 375/362 |
| 2019/0045037 A1* | 2/2019 | Sukhomlinov | H04L 67/40 |
| 2019/0065386 A1 | 2/2019 | Park | |
| 2019/0087245 A1 | 3/2019 | Yamaura | |
| 2019/0121659 A1* | 4/2019 | van Riel | G06F 9/4843 |
| 2020/0326980 A1* | 10/2020 | Prantner | G06F 9/4887 |

FOREIGN PATENT DOCUMENTS

| | | |
|---|---|---|
| JP | 2019-53591 A | 4/2019 |
| WO | WO 2015/029249 A1 | 3/2015 |

OTHER PUBLICATIONS

"Intel Ethernet Controller 1210 Datasheet" Intel Corp. Networking Division. Jun. 2018, 872 Pages.

* cited by examiner

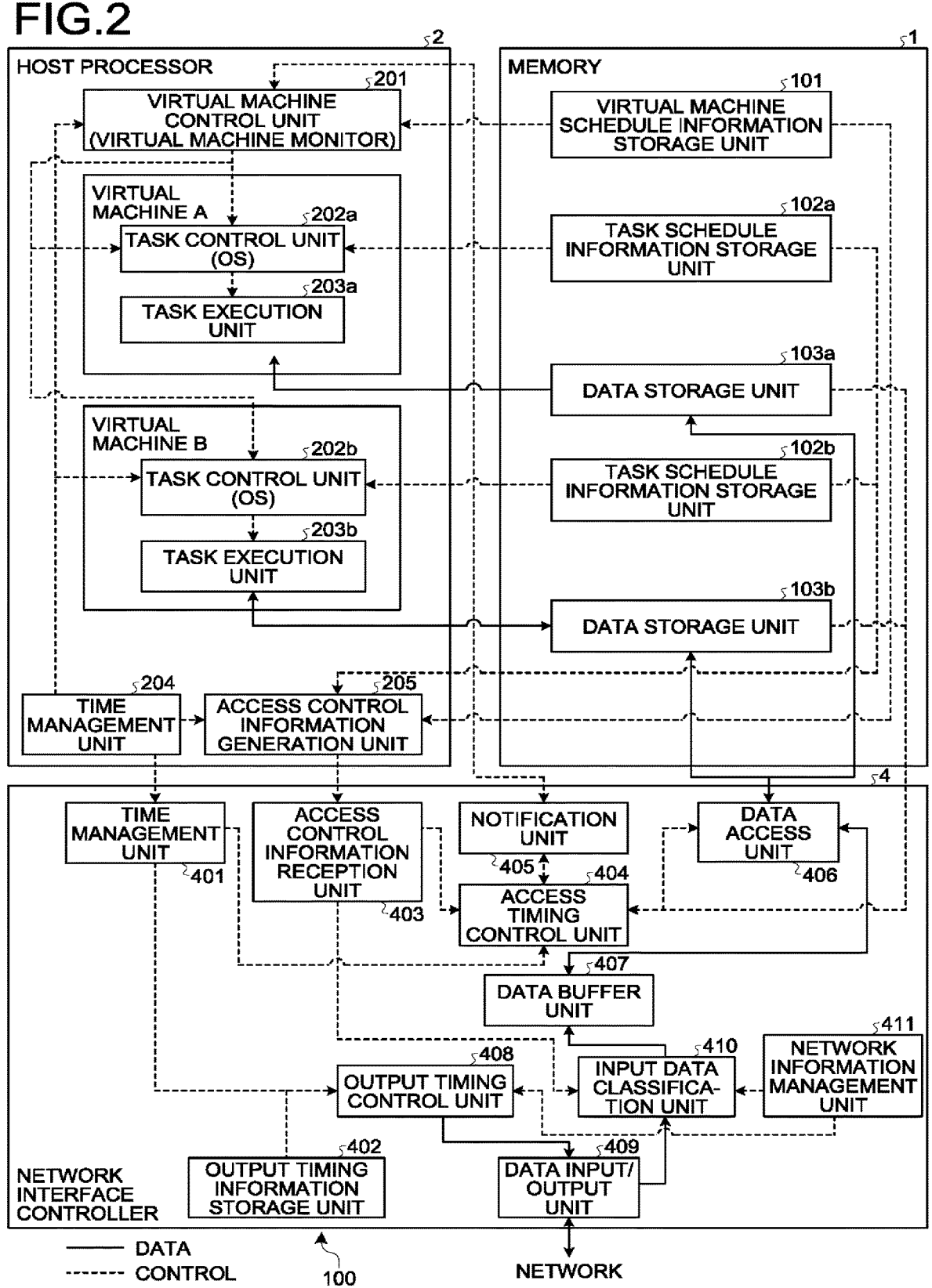

FIG.3

CPU CORE-0

| TIME (ms) | 0 | 1 | 2 | 3 | 4 | 5 | 6 | 7 | 8 | 9 |
|---|---|---|---|---|---|---|---|---|---|---|
| VIRTUAL MACHINE A (NEEDS TO BE REAL-TIME) | | ■ | | | | | | | | |
| VIRTUAL MACHINE B (NEEDS TO BE REAL-TIME) | | | | ■ | | | | ■ | | |
| VIRTUAL MACHINE C (DOES NOT NEED TO BE REAL-TIME) | | | ■ | | ■ | | ■ | | ■ | ■ |
| IDLING | ■ | | | | | ■ | | | | |

CPU CORE-1

| TIME (ms) | 0 | 1 | 2 | 3 | 4 | 5 | 6 | 7 | 8 | 9 |
|---|---|---|---|---|---|---|---|---|---|---|
| VIRTUAL MACHINE D (NEEDS TO BE REAL-TIME) | ■ | | | | | ■ | | | | |
| VIRTUAL MACHINE E (DOES NOT NEED TO BE REAL-TIME) | | | ■ | ■ | | | | | | |
| VIRTUAL MACHINE F (DOES NOT NEED TO BE REAL-TIME) | | | | | ■ | | | | ■ | |
| IDLING | | ■ | | | | | ■ | ■ | | |

■ EXECUTION PERIOD

FIG.4

VIRTUAL MACHINE A

| TIME (us) | 0 | 200 | 400 | 600 | 800 |
|---|---|---|---|---|---|
| TASK a | ■ | | | ■ | |
| TASK b | | ■ | | | |
| TASK c | | | ■ | | |
| IDLING | | | | | ■ |

VIRTUAL MACHINE B

| TIME (us) | 0 | 200 | 400 | 600 | 800 |
|---|---|---|---|---|---|
| TASK a | ■ | | | ■ | ■ |
| IDLING | | ■ | ■ | | |

VIRTUAL MACHINE D

| TIME (us) | 0 | 200 | 400 | 600 | 800 |
|---|---|---|---|---|---|
| TASK a | ■ | ■ | | | |
| TASK b | | | ■ | | |
| IDLING | | | | | ■ |

■ EXECUTION PERIOD

FIG.7

| PRIORITY (PCP) | 0 | 1 | 2 | 3 | 4 | 5 | 6 | 7 |
|---|---|---|---|---|---|---|---|---|
| TRAFFIC CLASS | 1 | 0 | 6 | 7 | 2 | 3 | 4 | 5 |

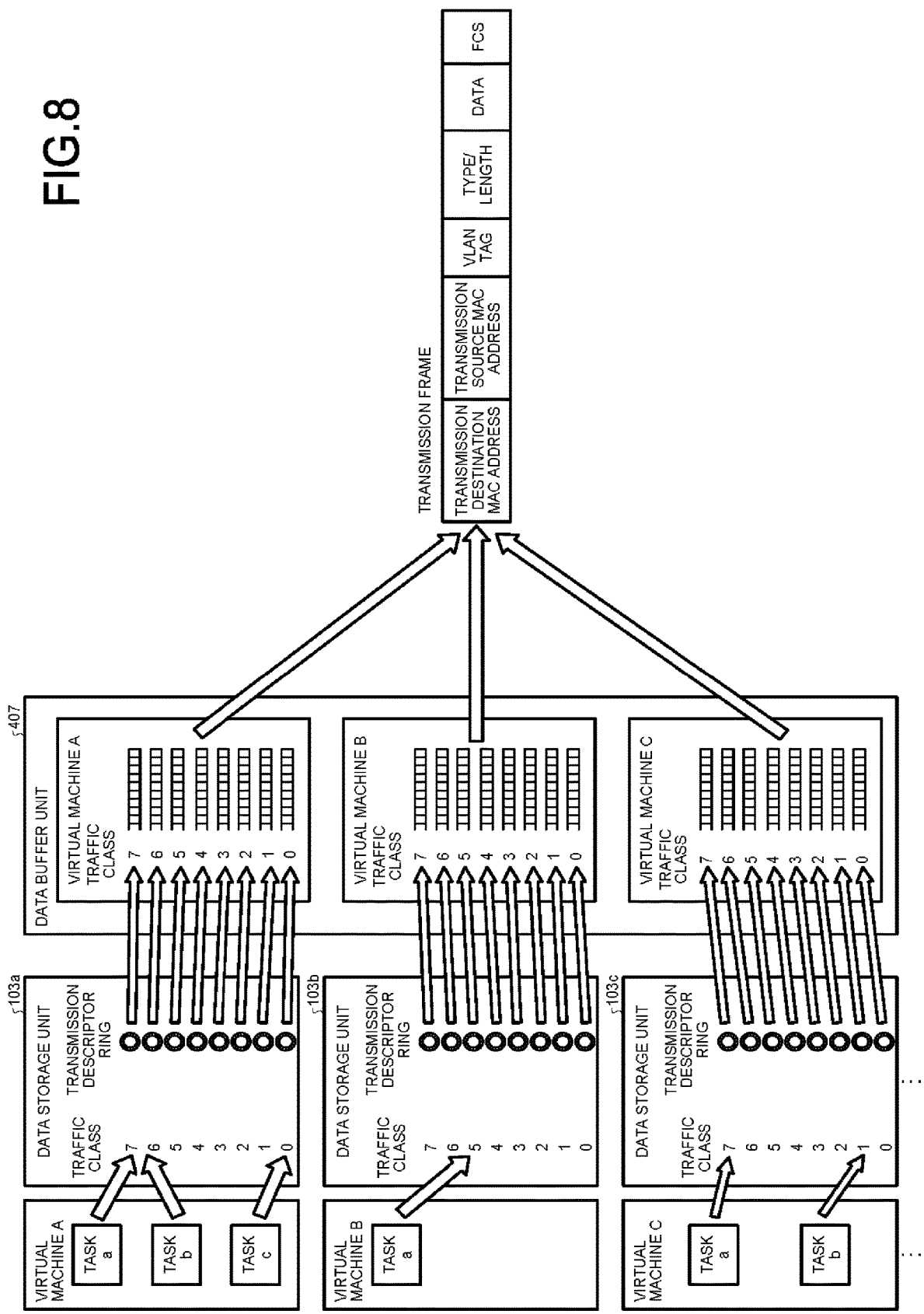

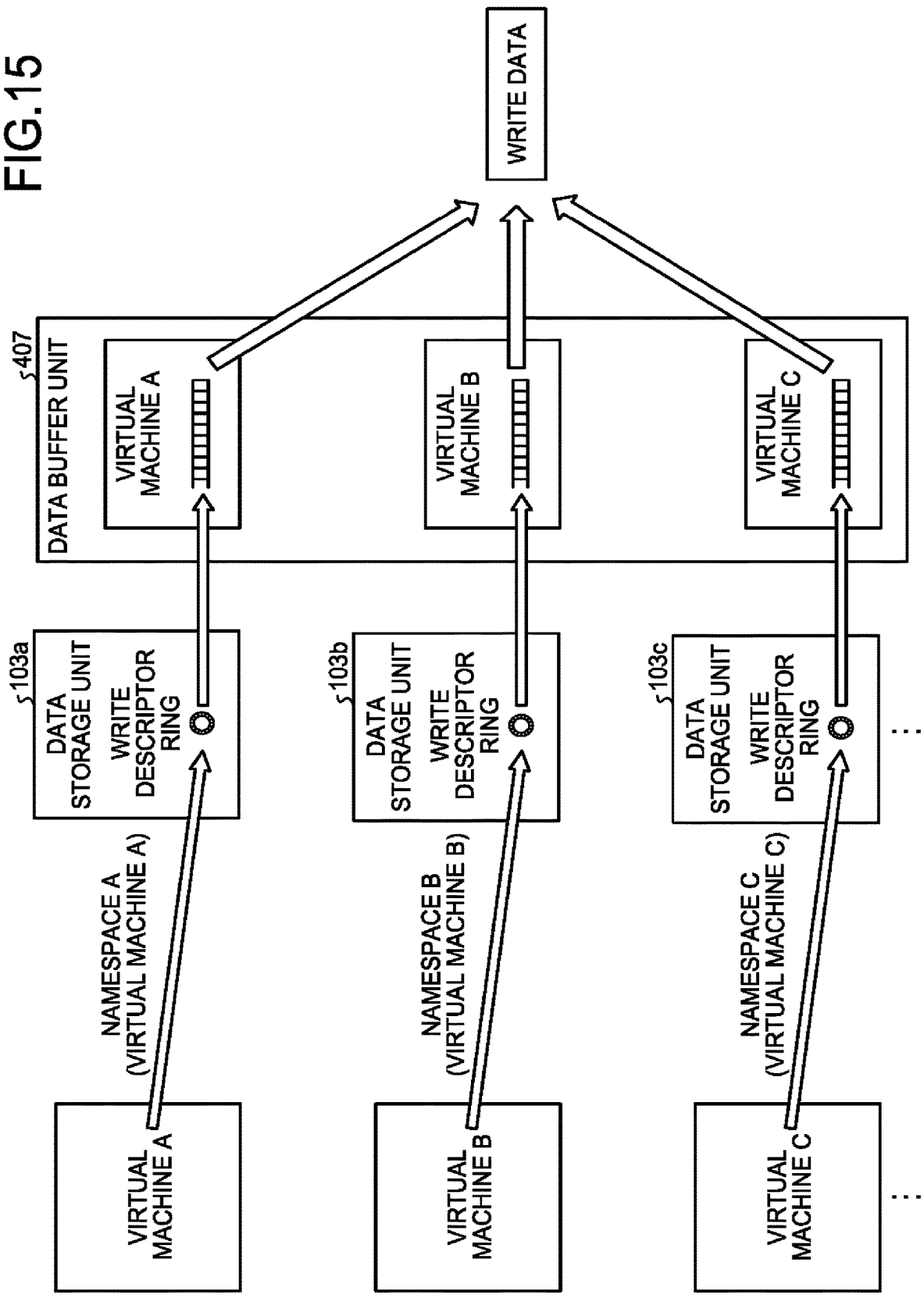

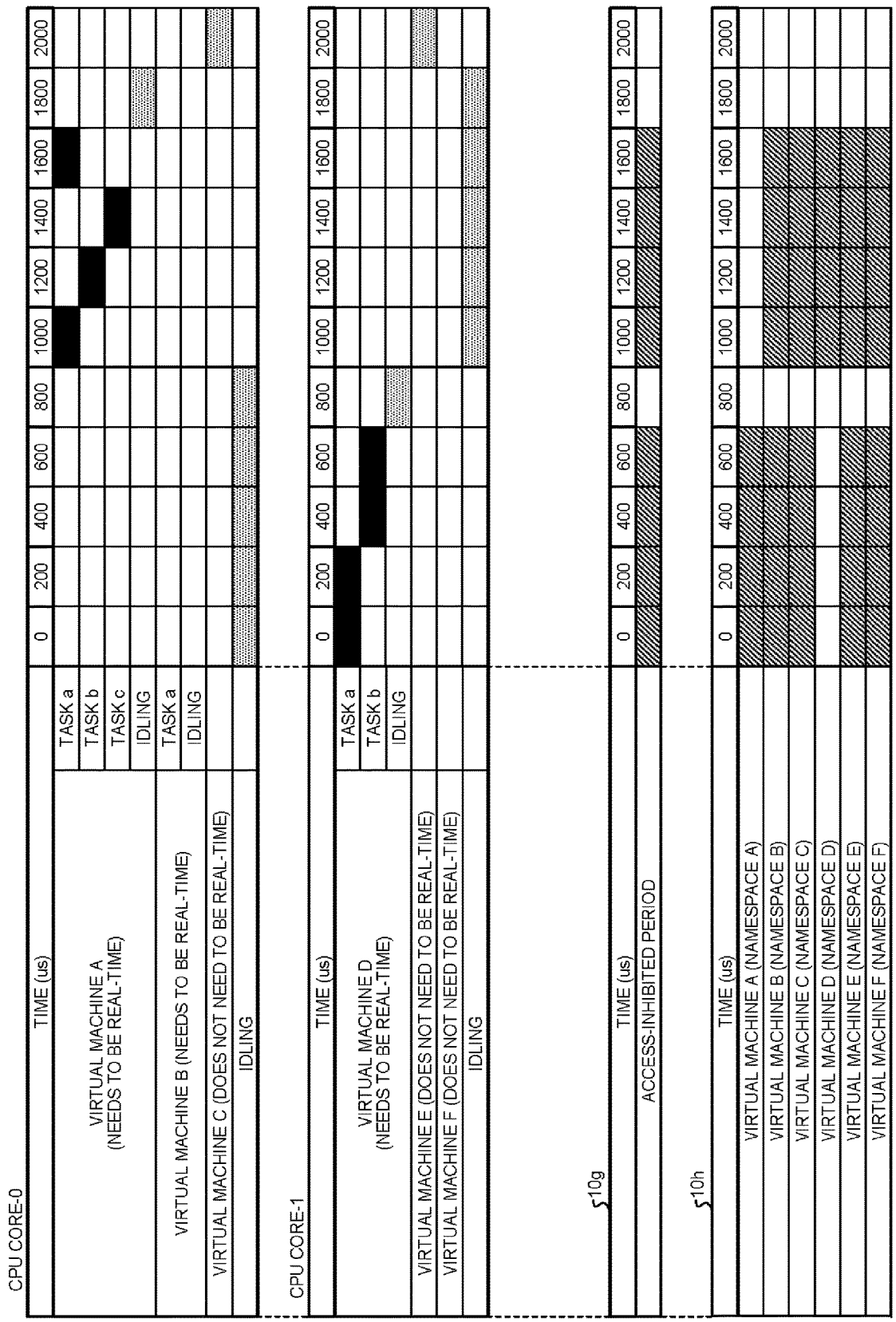

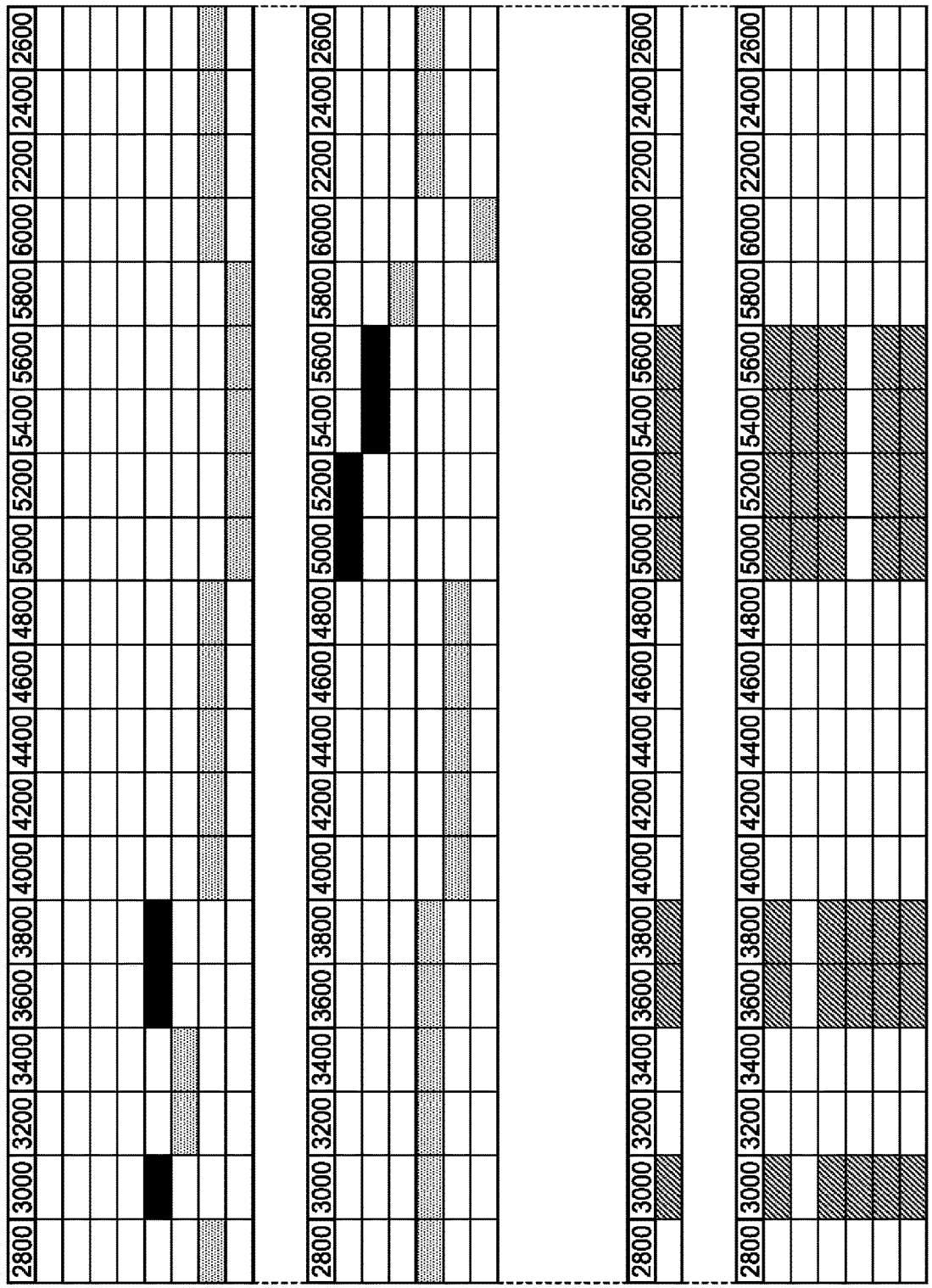

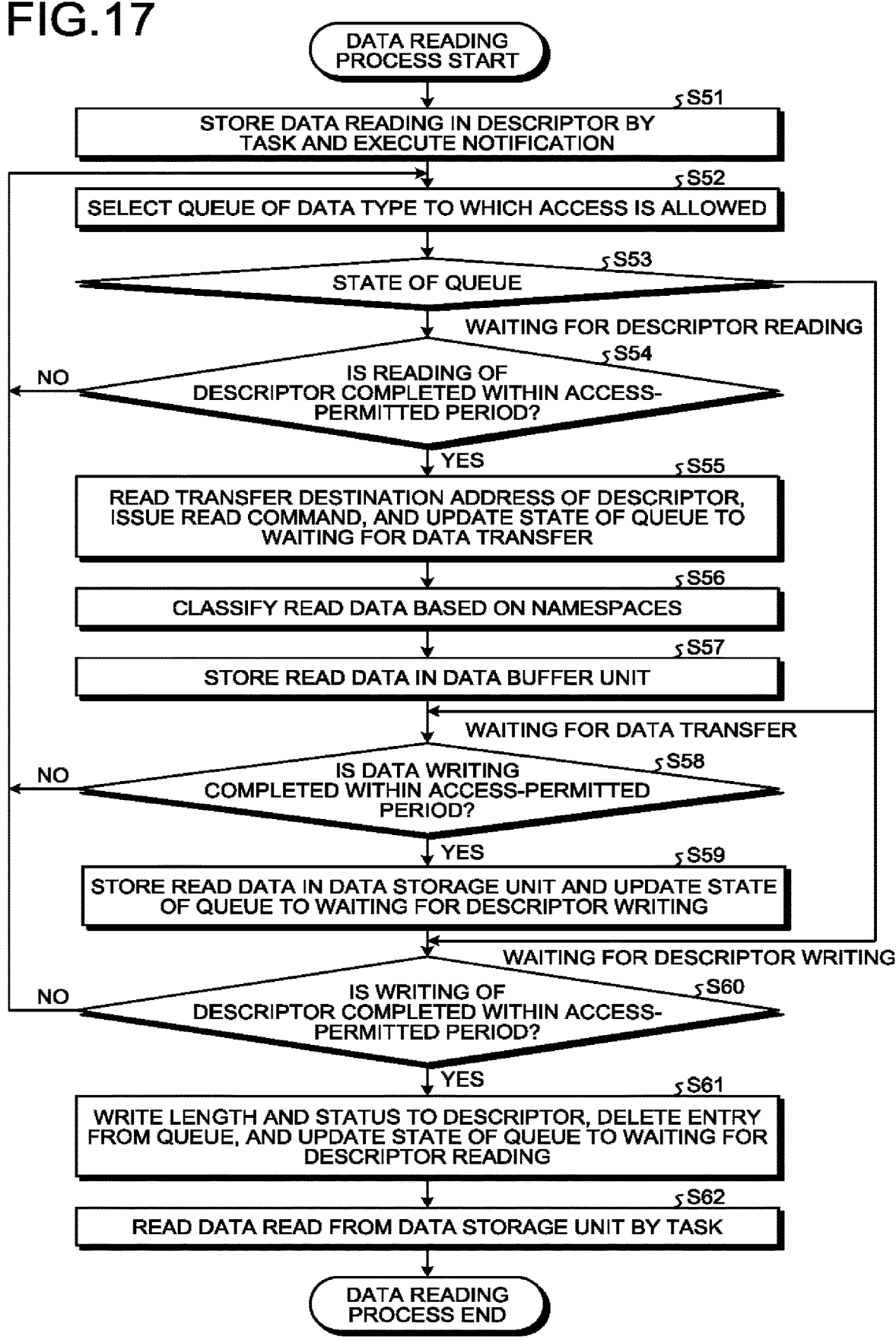

PROCESSING APPARATUS, PROCESSING METHOD, AND COMPUTER PROGRAM PRODUCT FOR CONTROLLING TIMING OF DATA ACCESSING TO A MEMORY

CROSS-REFERENCE TO RELATED APPLICATIONS

This application is based upon and claims the benefit of priority from Japanese Patent Application No. 2019-047969, filed on Mar. 15, 2019; the entire contents of which are incorporated herein by reference.

FIELD

Embodiments described herein relate generally to a processing apparatus, a processing method, and a computer program product.

BACKGROUND

There is known a technique that aggregates a plurality of machines to one host and operates the machines by using a virtual machine technique. Virtualization has prevailed in a field, such as an industrial system, and it is considered that the identical host operates a virtual machine executing a process that needs to be real-time (real-time process) and a virtual machine executing a process that does not need to be real-time (non-real-time process).

However, in the conventional technique, it is difficult to control data access to a memory while considering the real-time process executed by a host processor.

BRIEF DESCRIPTION OF THE DRAWINGS

FIG. 2 is a diagram illustrating an example of a functional configuration of the processing apparatus of the first embodiment;
FIG. 3 is a diagram illustrating an example of virtual machine schedule information of the first embodiment;
FIG. 4 is a diagram illustrating an example of task schedule information of the first embodiment;
FIG. 7 is a diagram illustrating an example of mapping information of the first embodiment;
FIG. 8 is a diagram illustrating a flow of data in a transmission process of the first embodiment;
FIG. 15 is a diagram illustrating a flow of data in a data writing process of the second embodiment;
FIG. 16A is a diagram illustrating an example of access control information of the second embodiment;
FIG. 16B is a diagram illustrating an example of the access control information of the second embodiment;
FIG. 17 is a flowchart illustrating an example of a data reading process of the second embodiment.

DETAILED DESCRIPTION

According to an embodiment, a processing apparatus includes a memory and a processor coupled to the memory. The processor is configured to: execute data access that is at least one of data writing to the memory and data reading from the memory; receive access control information for controlling timing of the data access to be executed; and control the timing of the data access based on the received access control information.

The following describes embodiments of a processing apparatus, a processing method, and a computer program product in detail with reference to the attached drawings.

First Embodiment

Example of Hardware Structure

Figure 1:
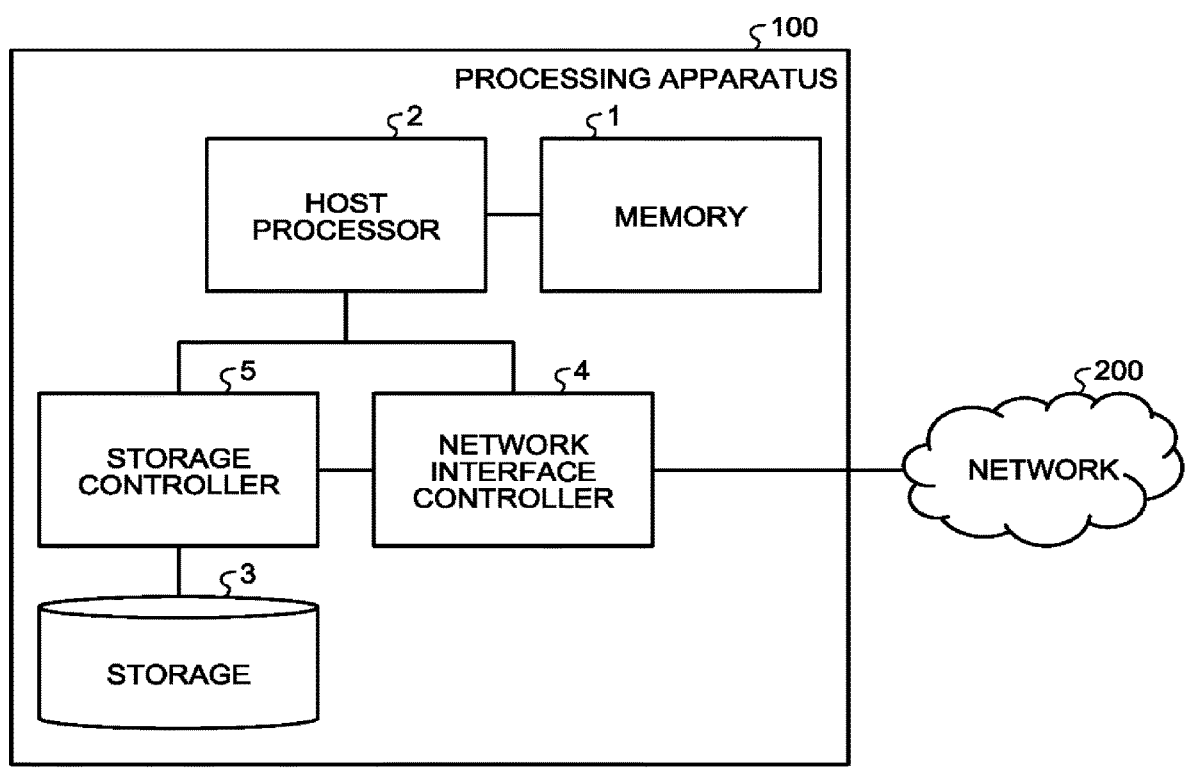
FIG. 1 is a diagram illustrating an example of a hardware structure of a processing apparatus of a first embodiment.

FIG. 1 is a diagram illustrating the example of the hardware structure of the processing apparatus of the first embodiment. The processing apparatus of the first embodiment includes a memory 1, a host processor 2, a storage 3, a network interface controller 4, and a storage controller 5.

The memory 1 is connected to the host processor 2 via a memory controller in the host processor 2. The memory 1 is implemented by, for example, Dynamic Random Access Memory (DRAM) or the like.

The host processor 2 is connected to the storage controller 5 using a bus, such as PCI Express (registered trademark). Similarly, the host processor 2 is connected to the network interface controller 4 using a bus, such as PCI Express (registered trademark).

The host processor 2 develops an image of an execution program stored in the storage 3 to the memory 1 and executes a process while reading an instruction and data on the memory 1. The process is executed by one or a plurality of cores included in the host processor 2. The host processor 2 has a hardware virtualization assistance function and can effectively execute a virtual machine by virtualization-compatible instruction set, Input/Output Memory Management Unit (IOMMU), and the like.

The storage 3 (and the storage controller 5) and the network interface controller 4 are peripheral apparatuses, peripheral devices, and peripherals connected to the host processor 2.

The storage 3 is, for example, implemented by a Hard Disk Drive (HDD), a Solid State Drive (SSD), and the like. The storage 3 is connected to the storage controller 5 in a specified standard, such as SATA, SAS, and U.2 (SFF-8639). The storage 3 and the storage controller 5 may be integrated.

The network interface controller 4 connects the host processor 2 to a network 200.

The network 200 is, for example, Ethernet (registered trademark). Specifically, the network 200 is a network supporting a standard defined in IEEE 802.1. The standard defined in IEEE 802.1 is, for example, the Audio Video Bridging (AVB) standard, the Time-Sensitive Networking (TSN) standard and the like. Any kind of the network 200 may be used. The network 200 is, for example, an office network, a network inside a data center, a vehicle-mounted network, an in-plant network, a network of a portable base station, and the like.

The network interface controller 4 and the storage controller 5 are each implemented by, for example, an Application Specific Integrated Circuit (ASIC), a Field-Programmable Gate Array (FPGA), and the like. The network interface controller 4 and the storage controller 5 each may be implemented by a combination of ASIC, FPGA, and a processor. The network interface controller 4 and the storage controller 5 each may incorporate a memory differing from the above-mentioned memory 1. The network interface controller 4 and the storage controller 5 each may be mounted as chips differing from the host processor 2 or may be mounted as one chip as a System-on-a-Chip (SoC).

[Example of Functional Configuration]

FIG. 2 is a diagram illustrating an example of a functional configuration of a processing apparatus 100 of the first embodiment. Functions of main parts of the processing apparatus 100 of the first embodiment are implemented by the above-mentioned memory 1, host processor 2, and network interface controller 4. The first embodiment gives the description with an example of a case where the processing apparatus 100 functions as a communication device.

In the host processor 2, virtual machines A to F operate. In FIG. 2, illustrations of the virtual machines C to F are omitted for want of space in the figure. Descriptions of functional configurations of the virtual machines C to F, inputs and outputs of the virtual machines C to F with other function blocks, and the like are similar to descriptions of functional configurations of the virtual machines A and B and inputs and outputs of the virtual machines A and B with other function blocks in FIG. 2.

The network interface controller 4 executes transmission and reception processes of a frame over the network 200 in accordance with an instruction from the host processor 2. The frame is, for example, an Ethernet (registered trademark) frame. The network interface controller 4 is compatible with Single Root I/O Virtualization (SR-IOV). Each of the virtual machines A to F is able to directly access the network interface controller 4 by means of a PCI Pass-through function. A notification unit 405 and a data access unit 406 in the network interface controller 4 may include interfaces independently accessible from the respective virtual machines of the virtual machines A to F. That is, a register access interface, a DMA interface, and an interrupt notification interface may be included in each virtual machine.

The memory 1 includes a virtual machine schedule information storage unit 101, task schedule information storage units 102a and 102b, and data storage units 103a and 103b.

The host processor 2 includes a virtual machine control unit 201, the virtual machines A to F, a time management unit 204, and an access control information generation unit 205. The virtual machine A includes a task control unit 202a and a task execution unit 203a. Similarly, the virtual machine B includes a task control unit 202b and a task execution unit 203b.

The network interface controller 4 includes a time management unit 401, an output timing information storage unit 402, an access control information reception unit 403, an access timing control unit 404, the notification unit 405, the data access unit 406, a data buffer unit 407, an output timing control unit 408, a data input/output unit 409, an input data classification unit 410, and a network information management unit 411.

The virtual machine control unit 201 provides management and control functions of computer resources to implement the virtual machines A to F. The virtual machine control unit 201 is, for example, a virtual machine monitor, a hypervisor, a virtualization OS, and the like. The virtual machine control unit 201 can logically separate and integrate the computer resources. For example, the virtual machine control unit 201 can logically separate one computer into the plurality of virtual machines A to F as if the one computer were a plurality of computers. This allows each of the virtual machines A to F to independently operate an OS and an application. The virtual machine control unit 201 controls the virtual machines A to F based on virtual machine scheduling information stored in the virtual machine schedule information storage unit 101. The virtual machine control unit 201 also manages and controls an interrupt notification notified from the peripheral device or the like and transmits the interrupt notification to the task control units 202a and 202b described later.

The virtual machine schedule information storage unit 101 stores the virtual machine scheduling information, which is provided to each CPU core.

Example of Virtual Machine Scheduling Information

FIG. 3 is a diagram illustrating an example of the virtual machine schedule information of the first embodiment. The example of FIG. 3 is scheduling information regulated by ARINC 653. In the example of FIG. 3, while execution periods of the respective virtual machines A to F are switched at a constant period (1 ms in this example), the respective virtual machines A to F periodically operate. That is, the respective virtual machines A to F are operable in the periods given as the execution periods.

While the example of ARINC 653 is given here, the scheduling method given to each CPU is not limited to this. For example, the scheduling method given to each CPU may be a scheduling method, such as credit base, Earliest Deadline First (EDF) base, and Real-Time-Deferrable-Server (RTDS) base. The scheduling operations by these scheduling methods are executed based on time information supplied by the time management unit 204.

Returning to FIG. 2, the time management unit 204 manages the time information in the host processor 2. Examples of the time information include time information synchronized in a time synchronization protocol, such as NTP, IEEE 1588, and IEEE 802.1AS, which may be used over the network 200. Alternatively, the time information may be time information synchronized with time information acquired from a GPS or the like. Note that the time information of the time management unit 204 is preferably synchronized with time information of the time management unit 401 in the network interface controller 4 described later.

The task control unit 202a manages and controls the entire virtual machine A. The task control unit 202a provides a function of a so-called Operating System (OS). The task may be a process, a thread, and a job and means a unit of a process controlled by the OS. The task control unit 202a manages and controls resources, such as a processor and a memory, required to execute the task. Specifically, the task control unit 202a assigns an execution period of the processor and the memory, switches the execution period, maps a virtual memory and a physical memory, and the like. Additionally, the task control unit 202a manages and controls the interrupt notification notified from the virtual machine control unit 201. The task control unit 202a assigns and controls a task execution period based on task schedule information stored in the task schedule information storage unit 102a.

Since the description of the task control unit 202b in the virtual machine B is similar to the description of the task control unit 202a in the virtual machine A, the description as to the task control unit 202b is omitted. Similarly, the following describes the similar descriptions of the virtual machines A and B with an example of the virtual machine A, while the description of the virtual machine B is omitted.

Example of Task Schedule Information

FIG. 4 is a diagram illustrating an example of the task schedule information of the first embodiment. FIG. 4 illustrates the example of the task schedule information of the virtual machines A, B, and D that execute a real-time process. It is assumed for the virtual machines A, B, and D that, Real-Time OSes (RTOSes) operate and, for example, the scheduling based on the regulation of ARINC 653 is executed. The virtual machine A operates tasks a to c, the virtual machine B operates the task a, and the virtual machine C operates the tasks a and b. In the virtual machine C, E, and F, general-purpose OSes operate separately. In the case of operating the general-purpose OS as well, as task scheduling information, information required for the scheduling, such as a priority of the task and an execution elapsed time of the task up to the present, is stored.

Returning to FIG. 2, the access control information generation unit 205 acquires the virtual machine schedule information from the virtual machine schedule information storage unit 101 and acquires the task schedule information from the task schedule information storage units 102a and 102b. The access control information generation unit 205 generates access control information and notifies the access control information reception unit 403 of this access control information.

The access control information includes, for example, information for controlling access based on the schedule information, such as the above-mentioned virtual machine schedule information and task schedule information. Specifically, the access control information includes, for example, information such as an access-prohibited period calculated based on a time at which the host processor 2 executes the real-time process. In this case, the access timing control unit 404 prohibits, for example, data access from the data access unit 406 to the memory 1 during the access-prohibited period. The access control information includes, for example, a real-time task process execution period specified according to the time information. In this case, the access timing control unit 404 limits or prohibits, for example, the data access from the data access unit 406 to the memory 1 during the real-time task process execution period. A specific example of the access control information will be described later.

In an environment that is not the virtual machine environment, the access control information may be generated by using only the task schedule information. When only the virtual machine scheduling information is acquired, the access control information may be generated using only the virtual machine scheduling information.

The data storage unit 103a is used to store the program executed by the task execution unit 203a and data held by the task execution unit 203a. Although not illustrated, the data storage unit 103a may store the data in the task control unit 202a. The task execution unit 203a executes the program while reading the program from the data storage unit 103a on the memory 1. The data storage unit 103a stores the data held in the task execution unit 203a. The data storage unit 103a is used to store data regarding the frame when the frame transmitted/received over the network interface controller 4 is transmitted. For example, the data storage unit 103a stores a reception descriptor ring to receive the frame, a transmission descriptor ring to transmit the frame, and data of the frame. The data storage unit 103a may be configured to house a plurality of network interfaces used by the virtual machine A, or the data storage units 103a may be provided for each of the network interfaces used by the virtual machine A.

Figure 5A:
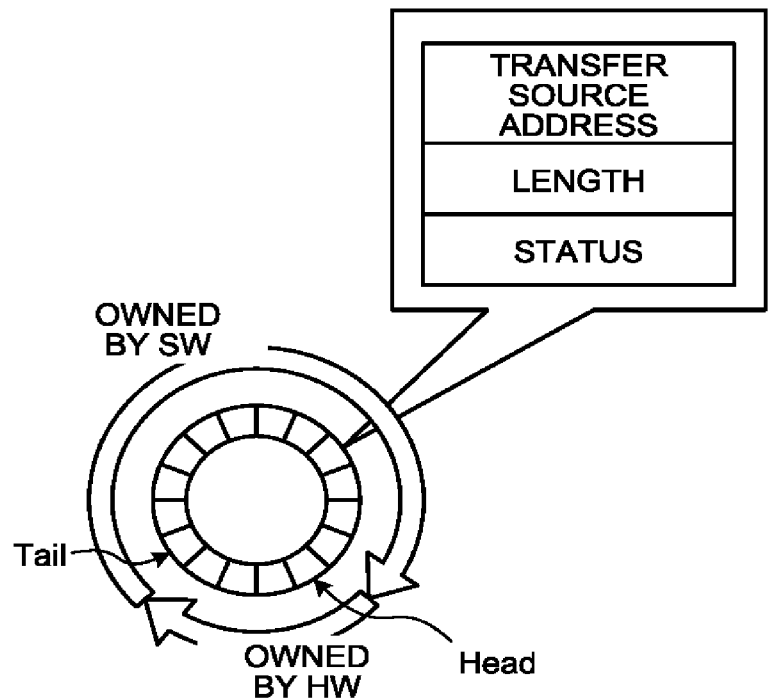
FIG. 5A is a diagram describing a transmission descriptor ring of the first embodiment.

FIG. 5A is a diagram describing the transmission descriptor ring of the first embodiment. The transmission descriptor is configured as a ring buffer managed using two variables, Head and Tail. As illustrated in FIG. 5A, a descriptor from Head to Tail-1 indicates hardware (HW), that is, a descriptor that the network interface controller 4 owns. A descriptor from Tail to Head-1 indicates software (SW), that is, a descriptor that software (the task control unit 202a or the task execution unit 203a) operating on the host processor 2 owns. Values of Head and Tail are exchanged through the notification unit 405 described later.

Each entry (each descriptor) of the transmission descriptor ring includes a transfer source address, a length, and a status. The transfer source address indicates a start address indicative of a start position of a storage area in the data storage unit 103a storing the data of the frame target for transmission. The length indicates a length of the frame target for transmission. The status stores information indicative of the state of the transmission process.

In view of the data access to the memory 1, the transmission descriptor ring is a descriptor ring managing data reading (reading of transmission data) from the memory 1.

Figure 5B:
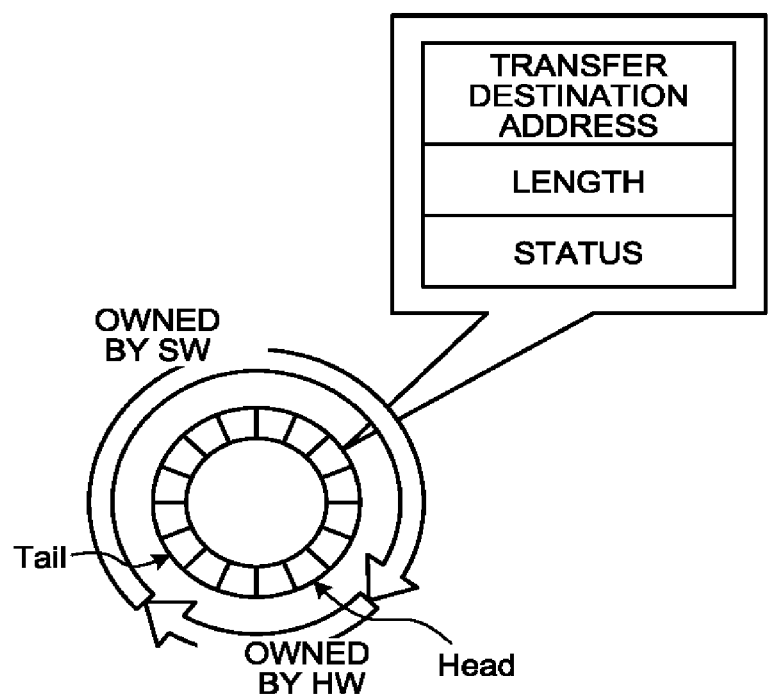
FIG. 5B is a diagram describing a reception descriptor ring of the first embodiment.

FIG. 5B is a diagram describing the reception descriptor ring of the first embodiment.

Each entry (each descriptor) of the reception descriptor ring includes a transfer destination address, a length, and a status. The transfer destination address indicates a start address indicative of a start position of a storage area in the data storage unit 103a storing the data of the frame target for reception. The length indicates a length of the frame target for reception. The status stores information indicative of the state of the reception process.

The above-mentioned statuses include, for example, error bits, DONE bits, and the like. The error bit indicates presence/absence of a transfer error. The DONE bit indicates termination of a process in the network interface controller 4. When the DONE bit of the transmission descriptor is 1, it means termination of the transmission process. When the DONE bit of the reception descriptor is 1, it means termination of the reception process. The network interface controller 4 writes 1 to the respective bits (the error bit and the DONE bit). After the task control unit (for example, a task control unit 202a) or the task execution unit (for example, the task execution unit 203a) confirms the respective bits, 0 is written to the respective bits to clear the respective bits.

From the viewpoint of the data access to the memory 1, the reception descriptor ring is a descriptor ring managing data writing (writing of received data) to the memory 1.

Returning to FIG. 2, the data input/output unit 409 includes functions referred to as Media Access Controller (MAC) and PHY. The data input/output unit 409 executes processes required to transmit and receive the frame in accordance with protocols of a data link layer and a physical layer.

The time management unit 401 in the network interface controller 4 manages the time information in the network interface controller 4. Examples of the time information include time information synchronized in a time synchronization protocol, such as NTP, IEEE 1588, and IEEE 802.1AS, which may be used over the network 200. The time information may be time information synchronized with time information acquired from a GPS or the like. This time information provided by the time management unit 401 is preferably synchronized with the above-mentioned time information provided by the time management unit 204 in the host processor 2. For example, when the time synchronization is executed in IEEE 1588 and IEEE 802.1AS, the data input/output unit 409 may give time stamps to the transmitted and received frames using a counter of the time management unit 401 and calculate a time offset from a ground master to correct the time information of the time management unit 401. Furthermore, the network interface controller 4 may correct a clock of the time management unit 204 on the host processor 2 based on a clock corrected by the data input/output unit 409.

The input data classification unit 410 is a functional unit that classifies the received frames.

Figure 6:
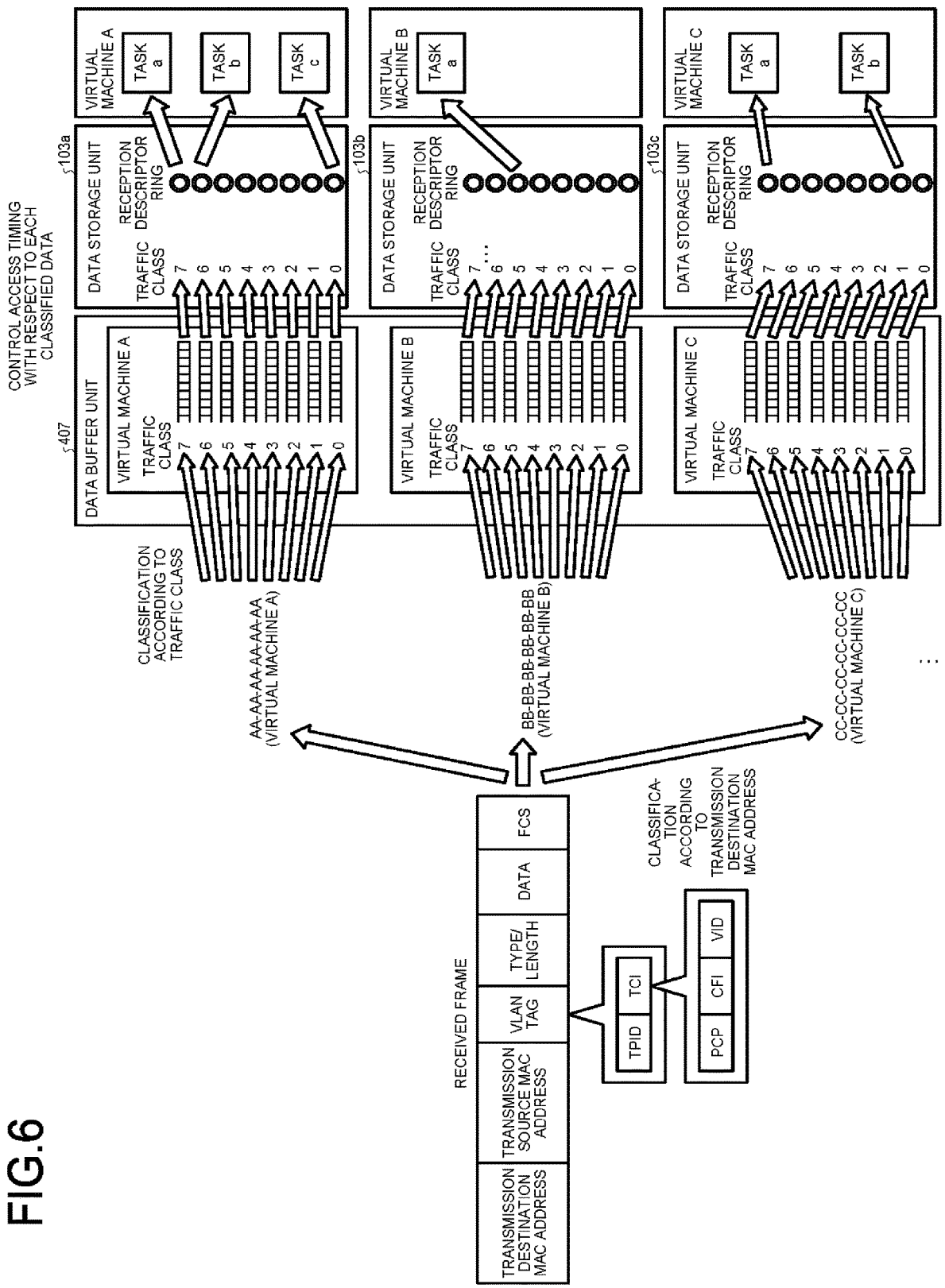
FIG. 6 is a diagram illustrating a flow of data in a reception process of the first embodiment.

FIG. 6 is a diagram illustrating a flow of data in the reception process of the first embodiment. As illustrated in FIG. 6, the input data classification unit 410 executes the classification based on a transmission destination MAC address and a traffic class of the received frame. In this example, it is assumed that a MAC address of the virtual machine A is AA-AA-AA-AA-AA-AA, a MAC address of the virtual machine B is BB-BB-BB-BB-BB-BB, and a MAC address of the virtual machine C is CC-CC-CC-CC-CC-CC. Although, in the example of FIG. 6, the virtual machines D to F are omitted, MAC addresses thereof are similar to the above cases of the virtual machines A to C.

The network information management unit 411 records correspondence information of the MAC addresses with the virtual machines A to C. Note that the network interface controller 4 connected to one virtual machine (for example, the virtual machine A) needs not to be one, and a plurality of the network interface controllers 4 may be connected. In this case as well, the correspondence is executed with the MAC addresses. First, using the transmission destination MAC address of the received frame, the input data classification unit 410 determines that the received frame is addressed to which virtual machine address. Next, the input data classification unit 410 acquires a PCP value indicative of a priority included in a VLAN tag of the received frame. Then, the input data classification unit 410 acquires the traffic class of the received frame from mapping information of the priority with the traffic class provided by the network information management unit 411, classifies the received frame, and stores the received frame in the data buffer unit 407.

FIG. 7 is a diagram illustrating an example of the mapping information of the first embodiment. In the example of FIG. 7, the values of the priority (PCP) of 0 to 7 are mapped to any of the values of 0 to 7 of the traffic class. This mapping information is also referred to as a traffic class table.

The data buffer unit 407 includes, for each of input (reception) and output (transmission), queues (FIFOs) to store the frames for respective combinations of the network interface controllers 4 connected to the virtual machines A to F and the traffic classes. Since respective entries in the queues store frames, whole data of a frame and a length of the frame are both stored in each entry.

When input (reception) is performed, the received frames classified by the input data classification unit 410 as described above are stored in the queues corresponding to respective data types classified for the combinations of the transmission destination MAC addresses of the network interface controllers 4 connected to the virtual machines A to F and the traffic classes and the like.

FIG. 8 is a diagram illustrating a flow of data in the transmission process of the first embodiment. When output (transmission) is performed, data has already been separated into the network interface controller 4 and the traffic classes at a time when the data is stored on the data storage unit 103a. Thus, the data are stored in the queues with respect to respective data types.

The data buffer unit 407 stores the state of the start frame in each queue. Specifically, the data buffer unit 407 stores information representing whether the reading of the descriptor has been completed, whether the transfer of the frame has been completed, and whether the writing of the descriptor has been completed.

The output timing control unit 408 controls timing at which the data (frame) is output to the network 200. The output timing is controlled to follow the TSN standard, such as IEEE 802.1Qbv, for example. The output timing control unit 408 determines timing at which the frames received from the respective virtual machines A to F are transmitted with a gate control list stored in the output tuning information storage unit 402, the mapping information recorded in the network information management unit 411, and the time information provided by the time management unit 401. Then, the output timing control unit 408 transmits the frames to the network 200 via the data input/output unit 409.

The access control information reception unit 403 receives the access control information generated by the access control information generation unit 205. A method for delivery and reception of the access control information may be a method, for example, of setting from the host processor 2 using a register interface or the like. Additionally, the method for delivery and reception of the access control information may be a method that includes an access control information storage unit in the memory 1, notifies a network interface controller 4 of an address of the access control information storage unit from the host processor 2, and reads the access control information from this access control information storage unit by the network interface controller 4.

The access control information is transmitted to the access timing control unit 404 and is used for timing control of data access described later. The information on the data type in the access control information may be transmitted to the input data classification unit 410 to switch the operation of the data classification by the input data classification unit 410.

The access timing control unit 404 controls, for example, timing at which the data access unit 406 accesses the data of the frame and the descriptor in the data storage unit 103a. The access timing control unit 404 performs the control such that the data storage unit 103a is not accessed during the access-prohibited period, which is included in the access control information received by the access control information reception unit 403. At this time, the access timing control uses the time information provided by the time management unit 401 in the network interface controller 4.

Specifically, in the reception, the access timing control unit 404 prohibits the data reading and the data writing to the reception descriptor and the writing of the frame data. In the transmission, the access timing control unit 404 prohibits the data reading and the data writing to the transmission descriptor and the reading of the frame data. The access timing control unit 404 determines whether the data access to the target data type is completed within an access-permitted period and instructs the data access unit 406 to access the data. In this determination, a transfer time of a bus between the memory 1 and the network interface controller 4 and a frequency of the memory access by the host processor 2 are taken into consideration. In order to perform this determination with time to spare, a guard band may be provided so as not to instruct the data access from the access timing control unit 404 to the data access unit 406 in the case where the remaining time until the termination of the access-permitted period falls below a constant value.

The data access unit 406 accesses the data of the frame and the data of the descriptor stored in the data storage units 103a and 103b and the data buffer unit 407. The data access unit 406 then transfers those data by DMA. The data access unit 406 executes the data access notified from the access timing control unit 404 with respect to each data type such as the MAC address and the traffic class.

In the reception, the data access unit 406 reads a transfer destination address from the reception descriptor and writes the data of the received frame read from the corresponding queue in the data buffer unit 407 to an area in the data storage unit (for example, the data storage unit 103a) designated by the transfer destination address. The data access unit 406 writes the length and the status to the reception descriptor in the data storage unit (for example, the data storage unit 103a).

In the transmission, the data access unit 406 reads the transfer source address and the length from the transmission descriptor, reads data by the amount designated by this length from an area in the data storage unit (for example, the data storage unit 103a) designated by the transfer source address and writes the data of the frame to the corresponding queue in the data buffer unit 407. Then, the data access unit 406 writes the status to the transmission descriptor in the data storage unit (for example, the data storage unit 103a).

The notification unit 405 executes notification between the host processor 2 and the network interface controller 4. Specifically, the notification unit 405 executes the notification using a register interface and an interrupt notification. The register interface provides an interface to read and write the variables Head and Tail, which manage the respective descriptor rings for transmission and reception in the data storage unit (for example, the data storage unit 103a), to the host processor 2. The host processor 2 is notified of the completion of reception of the frame and the completion of transmission of the frame by interrupt.

The network information management unit 411 manages the correspondence information of the MAC addresses with the virtual machines A to F and the above-mentioned mapping information (see FIG. 7) as network information. The mapping information of the traffic classes with the PCP values are set with respect to each Ethernet (registered trademark) port. The network information is given in advance from the virtual machine control unit 201, the task control units in the virtual machines A to F, the task execution units in the virtual machines A to F, or the like.

Next, the following describes setting of the access control information with reference to FIGS. 9A to 9D and 10.

FIGS. 9A to 9D are drawings illustrating an example of the access control information of the first embodiment. The access control information generation unit 205 calculates a real-time task execution period from the virtual machine schedule information and the task schedule information. As illustrated in FIGS. 9A to 9D, this calculation process is executed for each CPU core and calculates the real-time task execution period from the respective virtual machines A to F and the schedule information of the tasks a to c.

There are some methods of calculating the real-time task execution period.

For example, like access control information 10a, access during execution of a real-time task may be equally prohibited. Determining the access-prohibited period like the access control information 10a allows data access without hindering the process of the real-time task. For example, at a period of 0 to 799 us, the access to the memory 1 by the data access unit 406 is prohibited.

Alternatively, like access control information 10b, access from the virtual machines other than the virtual machine executing the real-time task may be prohibited. Frames (data) of the virtual machines A to F are classified according to Media Access Control (MAC) addresses included in the frames. Determining the access-prohibited period like the access control information 10b allows restraining a communication delay of the virtual machine executing the real-time process while restraining communications of the virtual machines executing non-real-time processes. For example, at a period of 0 to 399 us, regarding the data of the virtual machine D executing the task a, which needs to be real-time, the data access unit 406 is allowed to access the memory 1. Additionally, at a period of 400 to 799 us, regarding the data of the virtual machine D executing the task b, which needs to be real-time, the data access unit 406 is allowed to access the memory 1.

Alternatively, like access control information 10c, accesses other than access to the designated traffic class (priority) may be further prohibited. Determining the access-prohibited period like the access control information 10c allows restraining a delay of communications of the real-time task in execution while eliminating an influence to the real-time task from communications of another task in units of tasks. For example, at a period of 0 to 399 us, regarding data of a traffic class 7 of the virtual machine D used to execute the task a, which needs to be real-time, the data access unit 406 is allowed to access the memory 1. Additionally, at a period of 400 to 799 us, regarding data of a traffic class 1 of the virtual machine D used to execute the task b. which needs to be real-time, the data access unit 406 is allowed to access the memory 1.

Alternatively, like access control information 10d, communications of the task whose priority is lower than the task in execution may be prohibited. In other words, communications of the task whose priority is higher than that of the task in execution may be permitted. The larger the value of the traffic class is, the higher the priority is. For example, at a period of 0 to 399 us, regarding the data of the traffic class 7 of the virtual machine D used to execute the task a, which needs to be real-time, the data access unit 406 is allowed to access the memory 1. At a period of 400 to 799 us, regarding the data of the traffic class 1 of the virtual machine D used to execute the task b, which needs to be real-time, and the data of the traffic class 7 of the virtual machine D used to execute the task a, which needs to be real-time, the data access unit 406 is allowed to access the memory 1.

Alternatively, like access control information 10e, the access-permitted period may be shifted forward in units of one period (200 us) such that the communications are completed before the execution of the real-time task. For example, the access-permitted period of 0 to 199 us of the access control information 10e corresponds to the access-permitted period of 200 to 399 us of the access control information 10c. For example, the access-permitted period of 200 to 399 us of the access control information 10e corresponds to the access-permitted period of 400 to 599 us of the access control information 10c. For example, the access-permitted period of 400 to 599 us of the access control information 10e corresponds to the access-permitted period of 600 to 799 us of the access control information 10c.

Note that an access-limited period, in which a throughput is set to equal to or less than a constant amount, may be employed instead of the above-mentioned access-prohibited period in which the access is completely prohibited. That is, the access timing control unit 404 may limit the data access during the access-limited period.

Figure 9A:
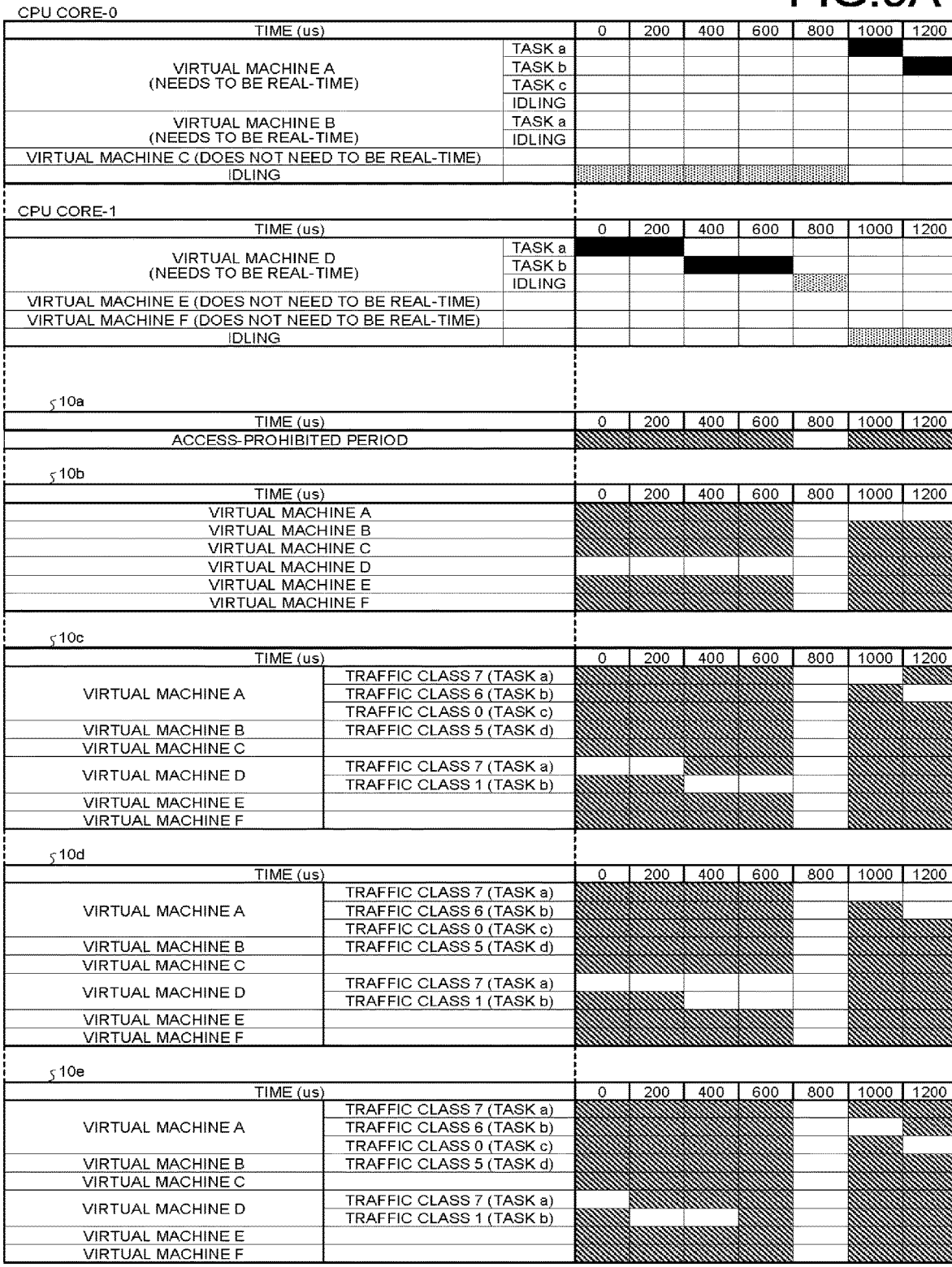
FIG. 9A is a diagram illustrating an example of access control information of the first embodiment.
Figure 9B:
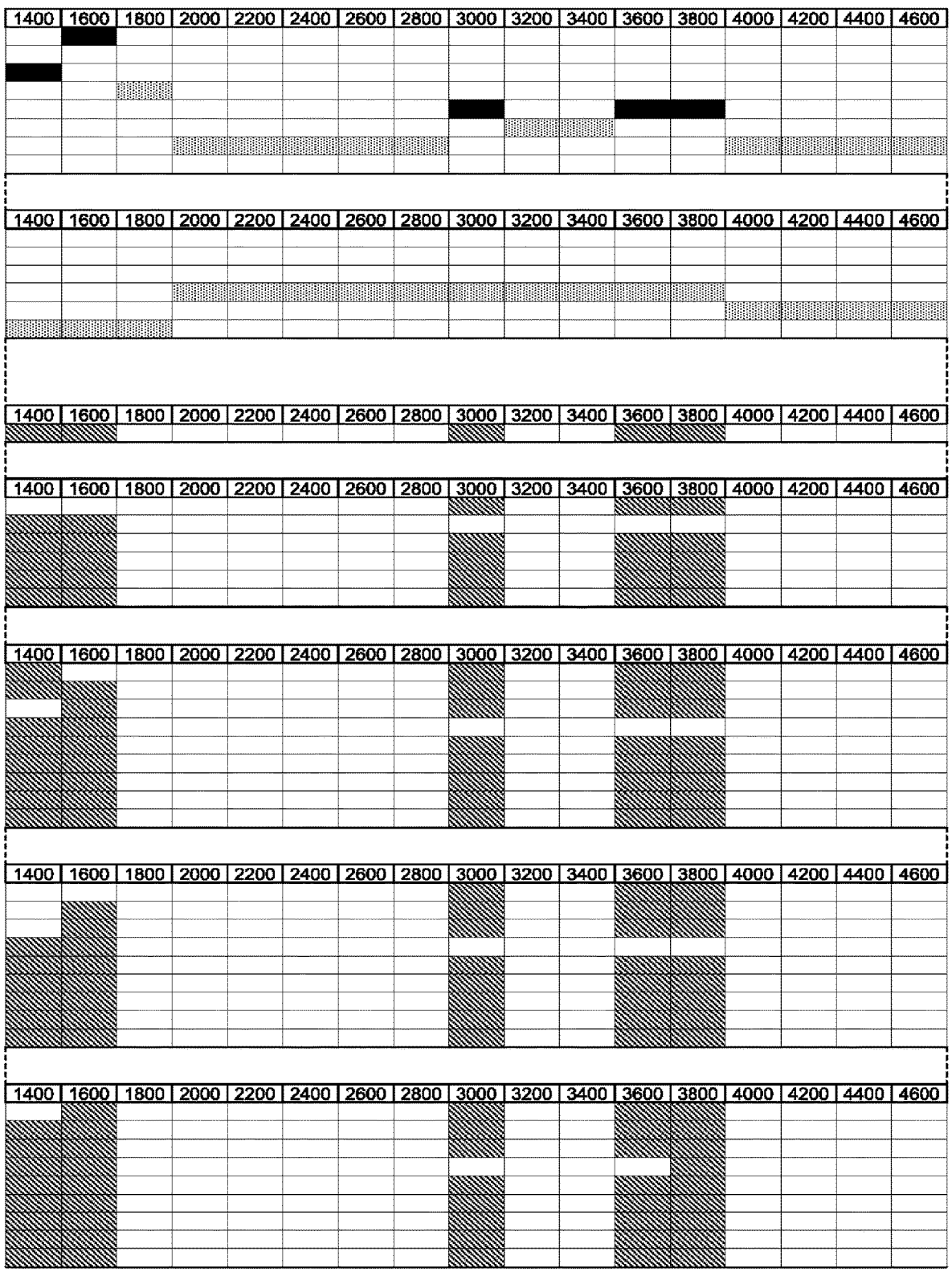
FIG. 9B is a diagram illustrating an example of the access control information of the first embodiment.
Figure 9C:
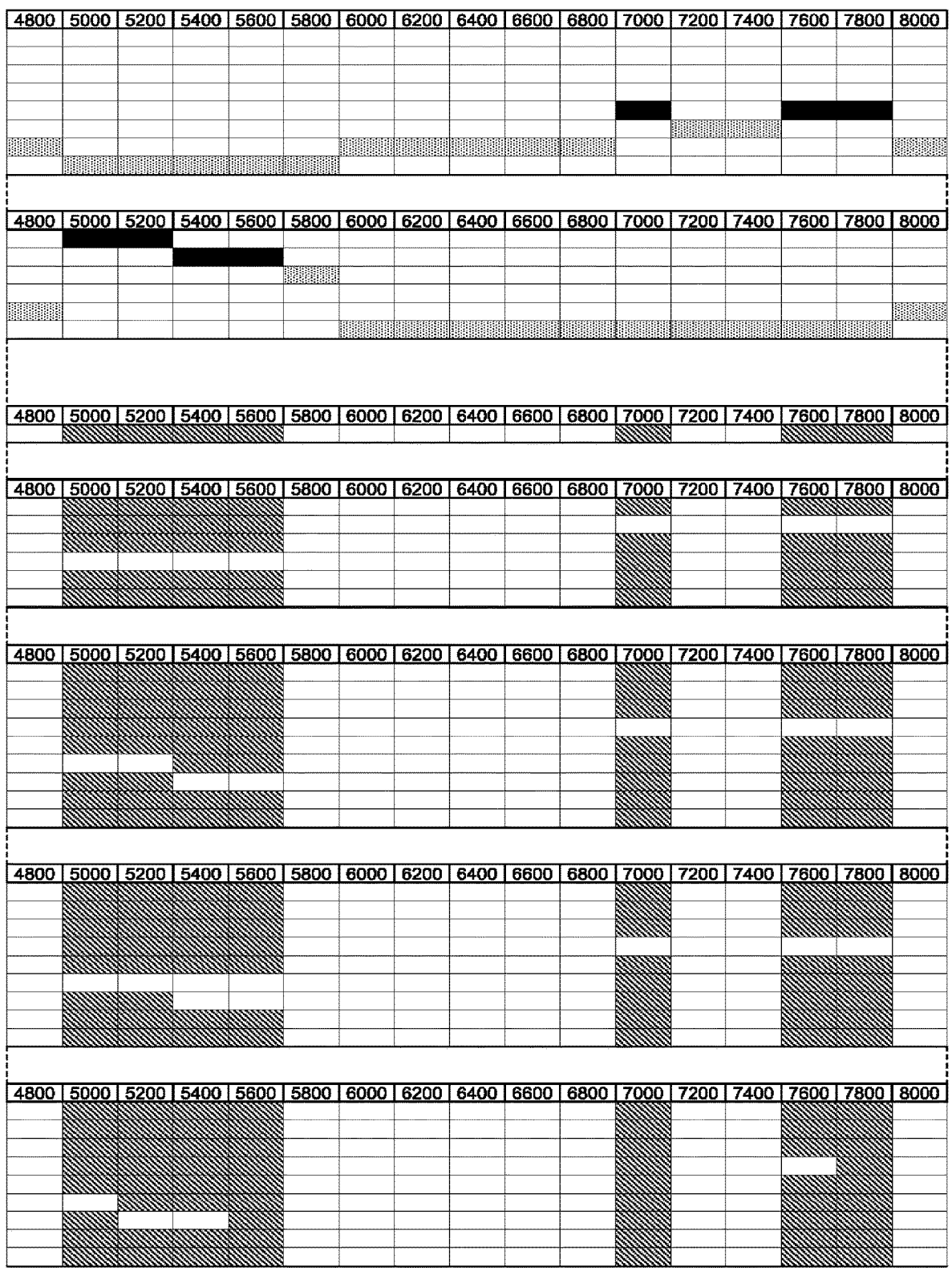
FIG. 9C is a diagram illustrating an example of the access control information of the first embodiment.
Figure 9D:
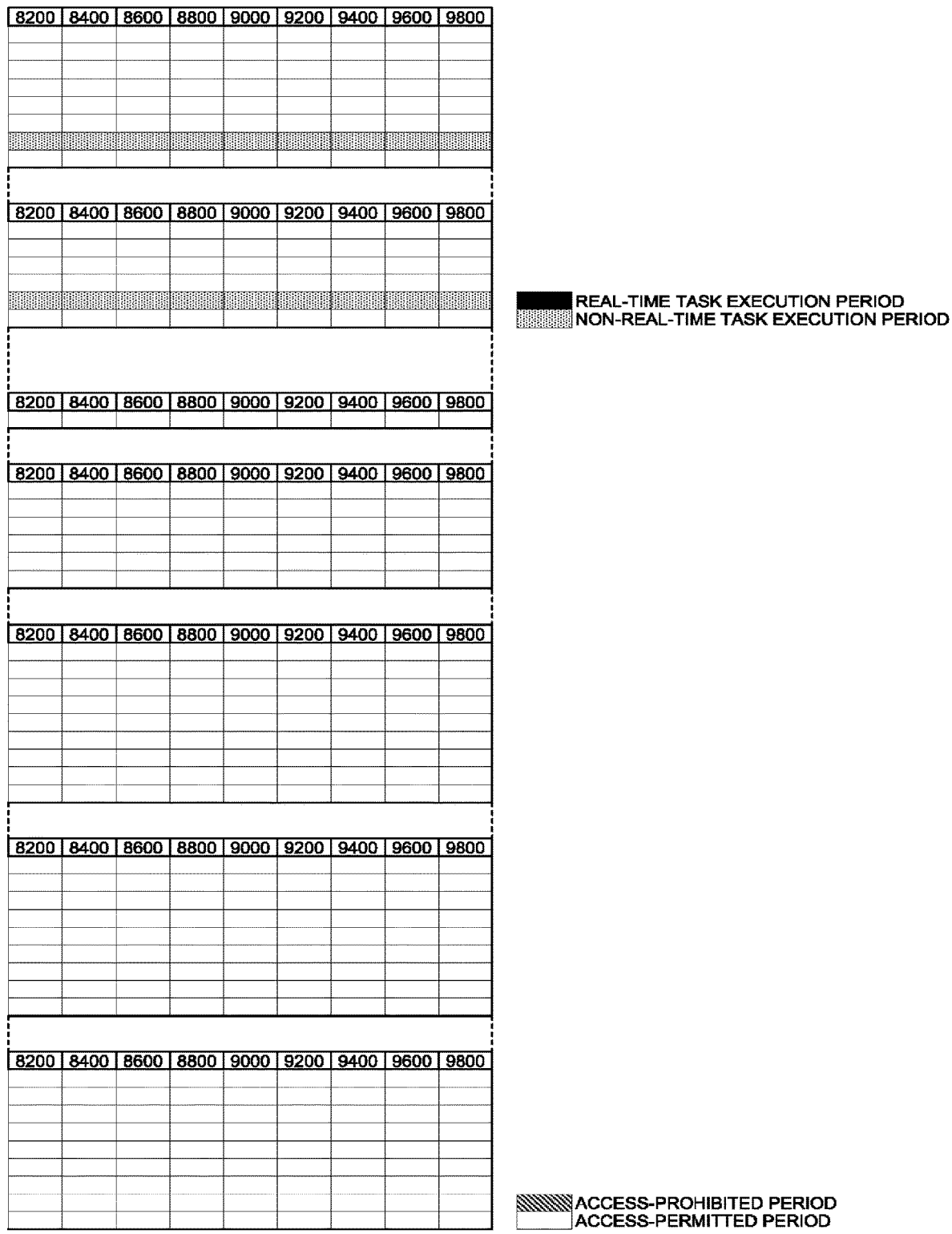
FIG. 9D is a diagram illustrating an example of the access control information of the first embodiment.
Figure 10:
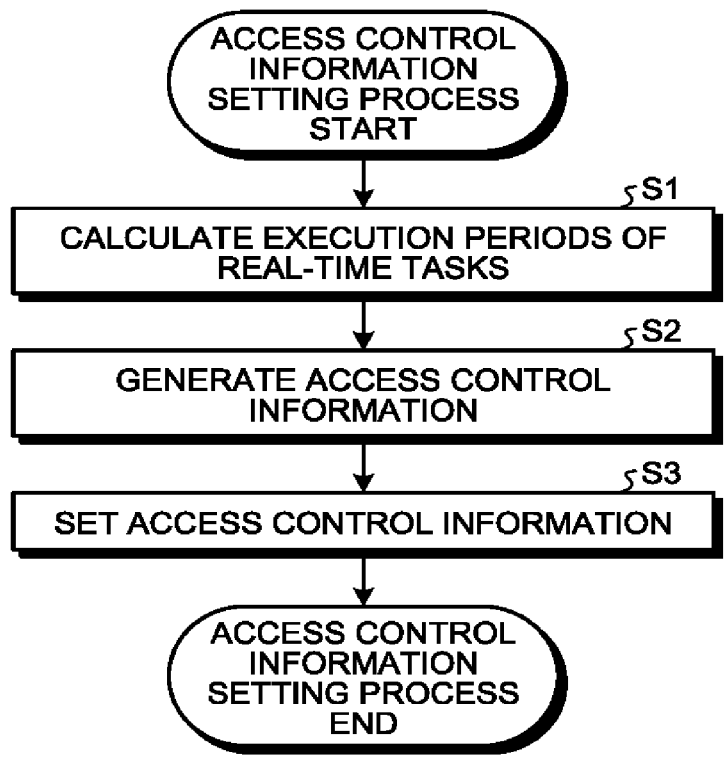
FIG. 10 is a flowchart illustrating an example of a setting process of the access control information of the first embodiment.

FIG. 10 is a flowchart illustrating an example of the setting process of the access control information of the first embodiment. First, the access control information generation unit 205 calculates the real-time task execution periods of the CPU core-0 and the CPU core-1 (Step S1). In the example of FIG. 9A, for example, since the task a, which needs to be real-time, is executed at the period of 0 to 399 us of the CPU core-1, the period is the real-time task execution period.

The access control information generation unit 205 generates the access control information (for example, the access control information 10d) (Step S2). Next, the access control information generation unit 205 sets the access control information generated by the process of Step S2 to the access control information reception unit 403 (Step S3).

Figure 11:
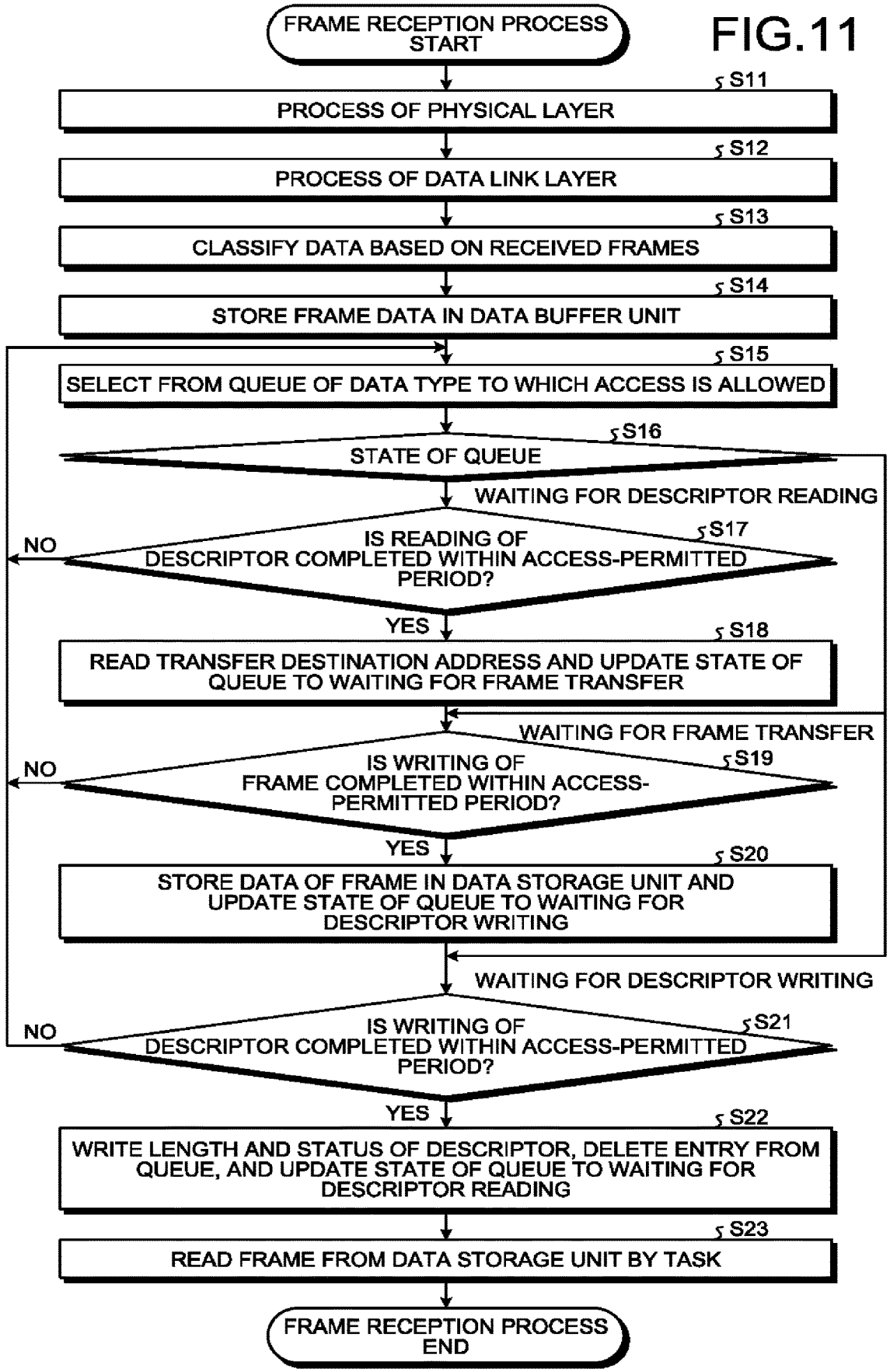
FIG. 11 is a flowchart illustrating an example of a frame reception process of the first embodiment.

The following describes a flow of the frame reception process with reference to FIG. 11.

Example of Frame Reception Process

FIG. 11 is a flowchart illustrating an example of the frame reception process of the first embodiment. When the data input/output unit 409 receives the frame from the network 200, the data input/output unit 409 executes a reception process of the physical layer in Ethernet (registered trademark) (Step S11). The data input/output unit 409 executes a reception process of the data link layer in Ethernet (registered trademark) (Step S12).

The input data classification unit 410 classifies the data based on the received frames (Step S13). At Step S13, as illustrated in the above-mentioned FIG. 6, the received frames are classified according to the transmission destination MAC addresses, the traffic classes acquired from the PCP values in the VLAN tags, and the like. Note that the classification may be executed by directly using the PCP values instead of the traffic classes.

Next, the input data classification unit 410 stores the received frames classified by the process of Step S13 in the data buffer unit 407 with respect to each data type (Step S14). The data buffer unit 407 can store the received frames in the queues with respect to each data type.

The access timing control unit 404 selects the received frame from the queues of the respective data types recorded in the data buffer unit 407 based on the time information provided by the time management unit 401 in the network interface controller 4 (Step S15). Specifically, the access timing control unit 404 selects the received frame from the queue in which the received frame is present during the access-permitted period of the queue. The access timing control unit 404, for example, may confirm whether the received frames are present in the order of the queues storing the received frames with the higher values of the traffic classes. For example, when access to the plurality of virtual machines is permitted, the access timing control unit 404 may confirm whether the received frames addressed to these virtual machines are present in order of round robin method.

Next, while the access timing control unit 404 determines whether the data transfer of the received frames is completed within the access-permitted period, the data access unit 406 reads the descriptor from, writes the frame to, and writes the descriptor to the data storage unit (for example, the data storage unit 103a). When the descriptor is read or written, the access timing control unit 404 executes the determination considering the length of the data of the descriptor. When the received frame is read or written, the access timing control unit 404 executes the determination considering the length of this received frame and a size of DMA transfer. Those relationships are assumed to be preliminarily given by measurement.

Specifically, first, the access timing control unit 404 confirms a state of the selected queue (Step S16). The state of queue includes three states: waiting for descriptor reading, waiting for frame transfer, and waiting for descriptor writing. The initial state is the waiting for descriptor reading. In the case where the state of the selected queue is the waiting for descriptor reading, the access timing control unit 404 determines whether the reading of the descriptor is completed within the access-permitted period before the reading (Step S17).

When the reading is not completed within the access-permitted period (Step S17: No), processing is returned to Step S15. When the reading is completed within the access-permitted period (Step S17: Yes), the access timing control unit 404 instructs the data access unit 406 to read the transfer destination address of the reception descriptor managed by the value of Head and updates this state of queue in the data buffer unit 407 to the waiting for frame transfer (Step S18). It is assumed that the task control unit (for example, the task control unit 202a) or the task execution unit (for example, the task execution unit 203a) preliminarily designates the transfer destination address for the area for storing the received frame.

When the state of queue enters the waiting for frame transfer, an access timing control unit 404 determines whether the writing of the received frame is completed within the access-permitted period before the writing (Step S19). This determination may be executed using the frame length.

When the writing is not completed (Step S19: No), processing is returned to Step S15. When the writing is completed (Step S19: Yes), the access timing control unit 404 instructs the data access unit 406 to read the data of the received frame from this queue in the data buffer unit 407 and write the data of the received frame in the area in the data storage unit (for example, the data storage unit 103a) designated by the transfer destination address, and updates this state of queue in the data buffer unit 407 to the waiting for descriptor writing (Step S20).

When the state of queue enters the waiting for descriptor writing, the access timing control unit 404 determines whether the writing of the descriptor is completed within the access-permitted period before the writing (Step S21).

When the writing is not completed (Step S21: No), processing is returned to Step S15. When the writing is completed (Step S21: Yes), the access timing control unit 404 instructs the data access unit 406 to write the length and the status to the reception descriptor, delete the entry of the received frame that has already been transferred from the queue, and updates this state of queue in the data buffer unit 407 to the waiting for descriptor reading (Step S22). When the process is normally terminated, data of 1 is written to the DONE bit in the status and the value of Head is increased by 1.

An area, in which the transfer destination address of the descriptor is cached, may be provided in each queue in the data buffer unit 407. When the transfer of the received frame is completed, the task execution unit (for example, the task execution unit 203a) reads the received frame triggered by reception completion interrupt notification from the notification unit 405 and polling (Step S23). The notification from the notification unit 405 is transmitted to the task execution unit (task execution unit 203a) via the virtual machine control unit 201 and the task control unit (for example, the task control unit 202a). An interrupt number different depending on each descriptor ring may be used for the interrupt. The task execution unit (for example, the task execution unit 203a) reads the status bit in the descriptor indicated by the value of Head in the descriptor ring notified by the interrupt, confirms that the DONE bit is 1, and receives the frame data by the amount designated by the length. By clearing (setting 0 to all bits) the status and writing a value of adding 1 to the value of Tail to a register notifying Tail, the network interface owns the used descriptor.

By the above-mentioned frame reception process of FIG. 11, the access by the data access unit 406 in the network interface does not collide with access such as reading of a program and reading and writing of data by the task execution unit (for example, the task execution unit 203a). Thus, the frame can be received without the collision with the memory access in the real-time process executed in the host processor 2.

Figure 12:
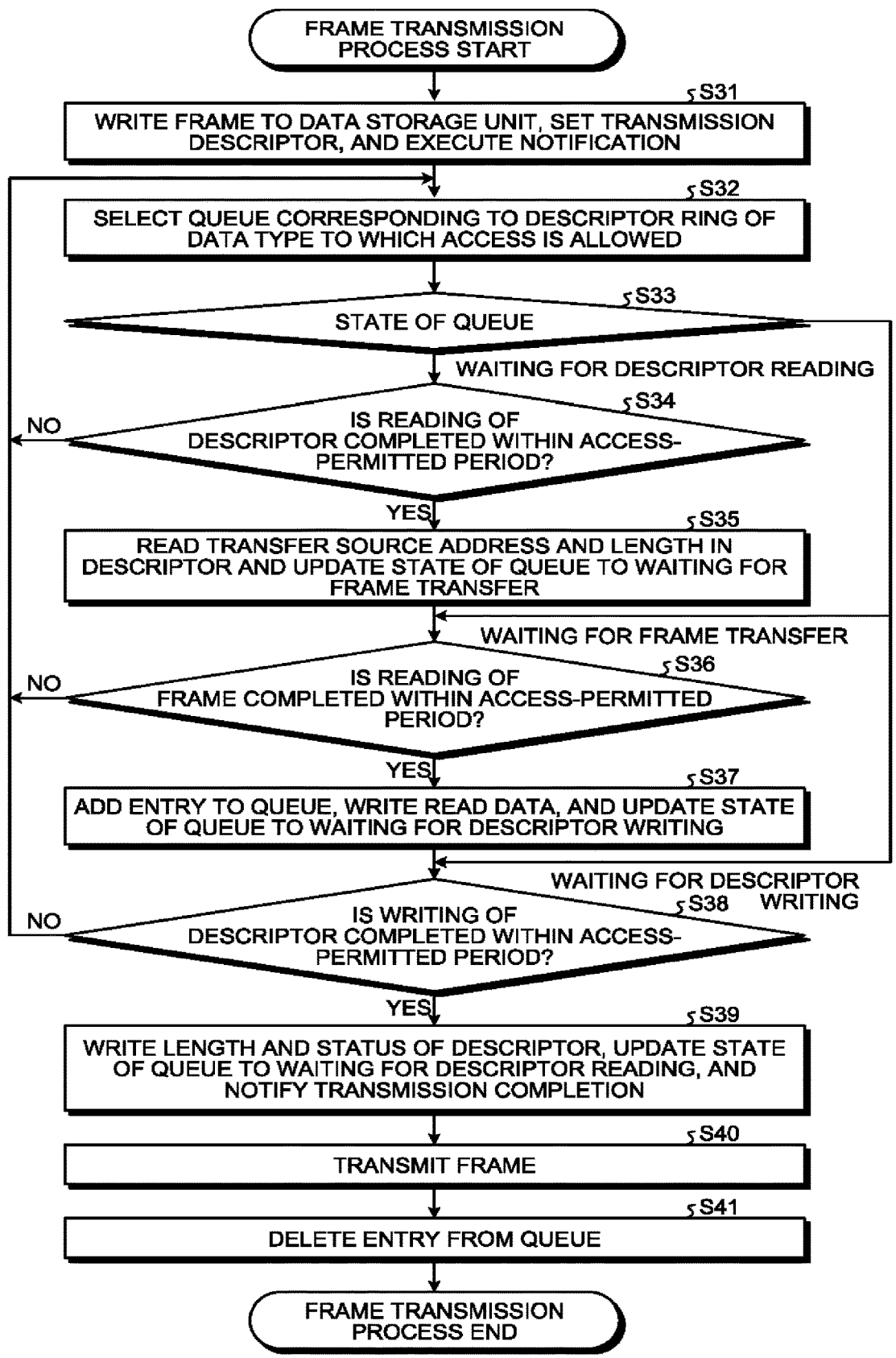
FIG. 12 is a flowchart illustrating an example of a frame transmission process of the first embodiment.

Next, the following describes a flow of the frame transmission process with reference to FIG. 12.

Example of Frame Transmission Process

FIG. 12 is a flowchart illustrating an example of the frame transmission process of the first embodiment. The example of FIG. 12 gives the description with an example of the case of the virtual machine A. First, the task execution unit 203a writes the data of the frame target for transmission to the data storage unit 103a, sets the transfer source address and the length to the transmission descriptor indicated by the value of Tail, writes a value of adding 1 to the value of Tail to a register managing the value of Tail via the task control unit 202a, the virtual machine control unit 201, and the like, and notifies the notification unit 405 of a transmission request of the frame (Step S31). As illustrated in FIG. 8, these settings are executed for each traffic class of the network interface controller 4 connected to the virtual machines A to F.

Next, the access timing control unit 404 selects one in which the transmittable frame is present (one on which the process has not been terminated yet after receiving the transmission request, that is, one with the descriptor owned by the network interface controller 4 is present) from the descriptors of the data types to which the access is permitted, and selects the queue in the data buffer unit 407 corresponding to the descriptor ring (Step S32).

The access timing control unit 404 confirms the state of the queue selected by the process of Step S32 (Step S33). The state of queue includes three states: waiting for descriptor reading, waiting for frame transfer, and waiting for descriptor writing. The initial state is a state of waiting for descriptor reading.

When the state of the selected queue is the waiting for descriptor reading, the access timing control unit 404 determines whether the reading of the descriptor is completed within the access-permitted period before the reading (Step S34).

When the reading of the descriptor is not completed within the access-permitted period (Step S34: No), processing is returned to Step S32. When the reading of the descriptor is completed within the access-permitted period (Step S34: Yes), the access timing control unit 404 instructs the data access unit 406 to read the transfer source address and the length in the transmission descriptor and updates this state of queue in the data buffer unit 407 to the waiting for frame transfer (Step S35).

When the state of queue enters the waiting for frame transfer, the access timing control unit 404 determines whether the writing of the transmission frame is completed within the access-permitted period before the writing (Step S36). This determination may be executed using the frame length and the DMA transfer size.

When the writing of the transmission frame is not completed (Step S36: No), processing is returned to Step S32. When the writing of the transmission frame is completed (Step S36: Yes), the access timing control unit 404 adds an entry to store the transmission frame to the queue in the data buffer unit 407, instructs the data access unit 406 to read the transmission frame data by the amount designated by the length from the area designated by the transfer source address in the data storage unit 103a and write the transmission frame data to the data buffer unit 407, and updates this state of queue in the data buffer unit 407 to the waiting for descriptor writing (Step S37).

When the state of the queue enters the waiting for descriptor writing, the access timing control unit 404 determines whether the writing of the descriptor is completed within the access-permitted period before the writing (Step S38).

When the writing of the descriptor is not completed (Step S38: No), processing is returned to Step S32. When the writing of the descriptor is completed (Step S38: Yes), the access timing control unit 404 instructs the data access unit 406 to write the status in the transmission descriptor and updates this state of queue in the data buffer unit 407 to the waiting for descriptor reading (Step S39). When the transfer is normally executed, the DONE bit is set to 1 and the writing is executed. An area in which the transfer source address of the descriptor is cached may be provided in each queue in the data buffer unit 407. When the transfer of the transmission frame is completed, a transmission completion interrupt notification is transmitted to the task execution unit 203a via the notification unit 405 through the virtual machine control unit 201 and the task control unit 202a.

The frame put in the queue in the data buffer unit 407 is transmitted to the network 200 via the data input/output unit 409 based on the output timing information by the output timing control unit 408 (Step S40) and the entry that has been transmitted is deleted from the queue (Step S41). Afterwards, the value of Head is updated to a value of adding 1 to the value of Head, and notification is executed to the task execution unit 203a by interrupt. The task execution unit 203a that has received the notification clears the status in the descriptor and executes a release process of the storage area of the frame indicated by the transfer source address and the length.

By the above-mentioned frame transmission process of FIG. 12, the access by the data access unit 406 in the network interface controller 4 does not collide with the access such as the reading of the program and data reading and writing by the task execution unit 203a. This allows the transmission of the frame without the collision with the memory access in the real-time process executed by the host processor 2.

As described above, in the first embodiment, the data access unit 406 executes the data access indicative of at least one of the data writing to the memory and the data reading from the memory. The reception unit (access control information reception unit 403) receives the access control information for controlling the timing of the data access. The control unit (access timing control unit 404) controls the timing of the data access based on the access control information.

According to the first embodiment, the data access to the memory 1 can be controlled considering the real-time process executed by the host processor 2. Specifically, it is capable of eliminating the need of considering the collision of the memory accesses by the host processor 2 and the network interface controller 4 and allowing the transmission and the reception of the frame without hindering the execution of the process that needs to be real-time. Moreover, this allows facilitating the calculation of the worst delay to ensure being real-time.

The conventional technique was not able to control memory access considering the operation of the real-time task. Additionally, the conventional technique was not able to control the timing of writing the data of the received frame to the memory 1 when the frame is received. In view of this, when the process that needs to be real-time is executed, the memory access by the host processor 2 and the memory access for transmission and reception of the frame are simultaneously executed, causing a problem of a delay in execution of the real-time process.

Modifications of First Embodiment

The following describes the modification of the first embodiment. In this modification, the description similar to the description of the first embodiment is omitted.

While the access control information generation unit 205 is provided in the host processor 2 in the original first embodiment, the access control information generation unit 205 may be provided in, for example, the network interface controller 4. In this case, the virtual machine schedule information and the task schedule information may be configured to be set to the network interface controller 4. In this case, the host processor 2 includes a schedule information setting unit that sets the schedule information, and the network interface controller 4 includes a schedule information reception unit. The schedule information includes at least one of the virtual machine schedule information and the task schedule information.

The original first embodiment gives the example of generating the access control information by using both of the virtual machine schedule information and the task scheduling information. Alternatively, when the virtual machine is not used, only the task scheduling information may be used or the access control information may be generated from only the virtual machine scheduling information.

The original first embodiment gives the example in which the network interface controller 4 is compatible with SR-IOV, and the respective virtual machines A to F can directly access the network interface controller 4. Alternatively, instead of the direct access from the respective virtual machines A to F to the network interface controller 4, bridges that connect the respective virtual machines A to F may be created in the virtual machines A to F or in the virtual machine control unit 201 (hypervisor), and the frame aggregated in those bridges may be transmitted and received.

While the original first embodiment gives the example in which the data of the frame is not separated and is transferred at once, the data of the frame may be separately transferred. In such a case, a data buffer unit 407 stores information indicating which frames have been transferred, and the transfer may be resumed at the access-permitted period.

The original first embodiment gives the example in which only the host processor 2 and the network interface controller 4 are connected to the memory 1. Alternatively. another peripheral processing apparatus, such as the storage controller 5, may be connected. In this case, a delay caused by another processing apparatus may be considered in the determination of the completion of the data access. For example, the completion determination may be executed assuming that a delay occurs by a value found by multiplying the maximum lengths of the data accesses by the respective processing apparatuses by the number of respective processing apparatuses.

In the original first embodiment, a guard band may be inserted at a time point when the access-permitted period switches to the access-prohibited period. By this configuration, even when there is a difference between the time information provided by the time management unit 204 in the host processor 2 and the time information provided by the time management unit 401 in the network interface controller 4, the control can be executed without collision of the memory accesses.

Second Embodiment

The following describes the second embodiment. In the second embodiment, the description similar to that of the first embodiment is omitted. The second embodiment is described with an example of causing a processing apparatus to function as a recording device.

Example of Functional Configuration

Figure 13:
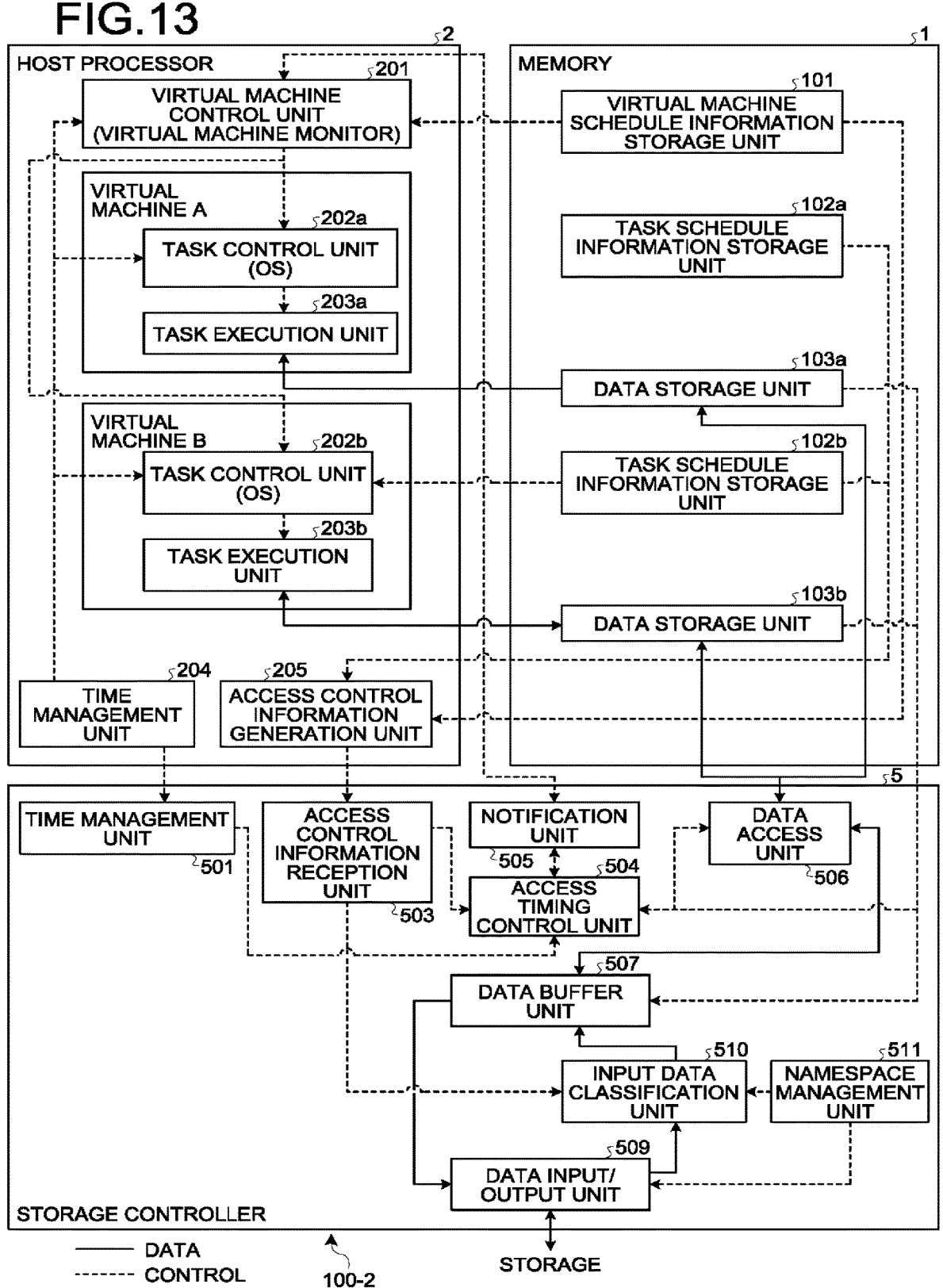
FIG. 13 is a diagram illustrating an example of a functional configuration of a processing apparatus of a second embodiment.

FIG. 13 is a diagram illustrating an example of a functional configuration of a processing apparatus 100-2 of the second embodiment. Functions of the main part of the processing apparatus 100-2 of the second embodiment are implemented by the above-mentioned memory 1, host processor 2, and storage controller 5. Configurations of the memory 1 and the host processor 2 are similar to those of the first embodiment.

The storage controller 5 includes a time management unit 501, an access control information reception unit 503, an access timing control unit 504, a notification unit 505, a data access unit 506, a data buffer unit 507, a data input/output unit 509, an input data classification unit 510, and a namespace management unit 511.

Although the storage controller 5 is approximately identical to the network interface controller 4, the storage controller 5 differs in that, the output timing information storage unit 402 and the output timing control unit 408 are not provided, and that the namespace management unit 511 is provided instead of the network information management unit 411.

In the data input/output unit 509 and the input data classification unit 510 in the storage controller 5, an input corresponds to reading from the storage 3 and an output corresponds to writing to the storage 3.

Configurations of the descriptors for the data reading and the data writing from the host processor 2 to the storage controller 5 are similar to those of the first embodiment (see FIGS. 5A and 5B).

Figure 14:
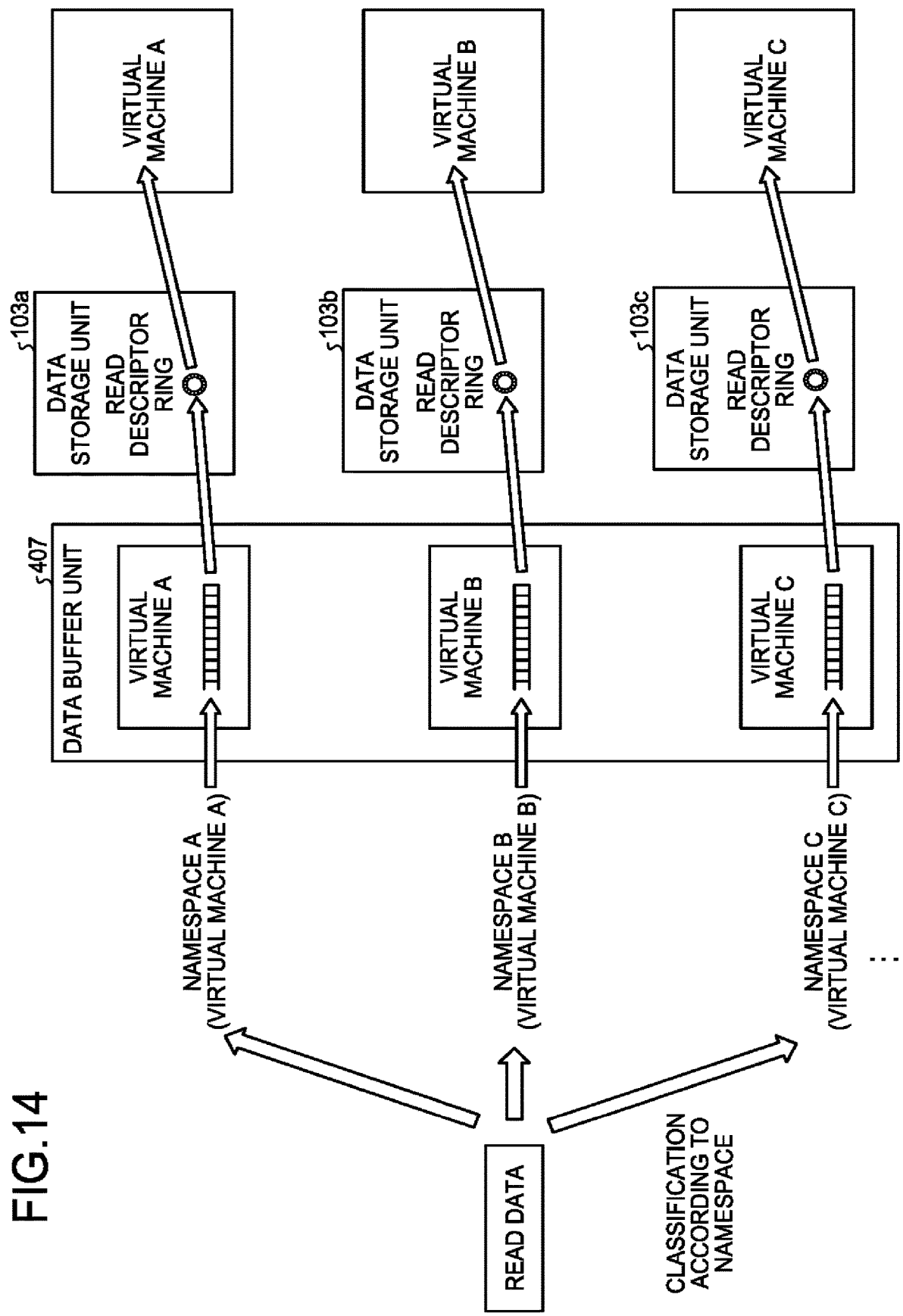
FIG. 14 is a diagram illustrating a flow of data in a data reading process of the second embodiment.
Figure 16C:
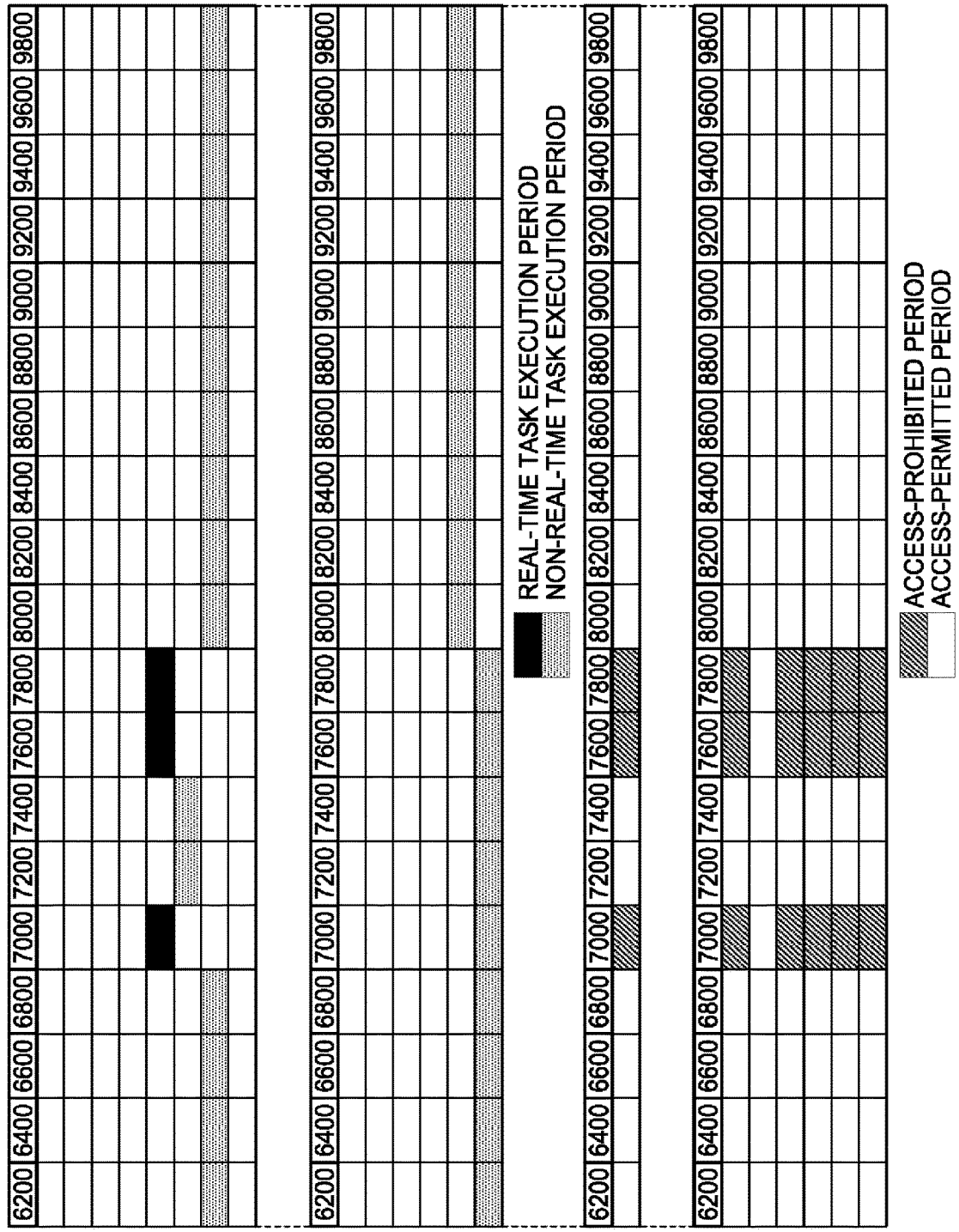
FIG. 16C is a diagram illustrating an example of the access control information of the second embodiment.

FIG. 14 is a diagram illustrating a flow of data in the data reading process of the second embodiment. Unlike the first embodiment (the case of operating as the communication device), in the second embodiment (the case of operating as the recording device), individual read data (that is equivalent to the received data of the first embodiment) are classified based on namespaces used in NVM Express or the like.

FIG. 15 is a diagram illustrating a flow of data in the data writing process of the second embodiment. Unlike the first embodiment (the case of operating as the communication device), the output timing control is not executed in the second embodiment (the case of operating as the recording device). The data input/output unit 509 writes write data (that is equivalent to the transmission data of the first embodiment) onto the storage.

FIGS. 16A to 16D are drawings illustrating an example of access control information of the second embodiment. The second embodiment differs from the first embodiment in that a type of data of each of the virtual machines A to F is identified by using the namespace.

Access control information 10*g* is an example in the case of equally prohibiting the access during execution of the real-time task. Determining the access-prohibited period like the access control information 10*g* allows data access without hindering the process of the real-time task. For example, at a period of 0 to 800 us. an access to the memory 1 by the data access unit 406 is prohibited.

Access control information 10*h* is an example of prohibiting access by the virtual machines other than the virtual machine executing the real-time task. Determining the access-prohibited period like the access control information 10*h* allows restraining a communication delay of the virtual machine executing the real-time process while restraining communications of the virtual machines executing the non-real-time processes. For example, at a period of 0 to 399 us, regarding the data of the virtual machine D executing the task a, which needs to be real-time, the data access unit 406 is allowed to access the memory 1. Additionally, at a period of 400 to 799 us, regarding the data of the virtual machine D executing the task b, which needs to be real-time, the data access unit 406 is allowed to access the memory 1.

Example of Data Reading Process

FIG. 17 is a flowchart illustrating an example of the data reading process of the second embodiment. An example of FIG. 17 gives a description with an example of the data reading process of the virtual machine A. First, the task execution unit 203*a* sets a transfer destination address and a length of read target data to a read descriptor in the data storage unit 103*a* and notifies the notification unit 405 via the task control unit 202*a*, the virtual machine control unit 201, and the like (Step S51).

Next, the access timing control unit 504 selects a queue of a data type recorded in the data buffer unit 507 based on the time information provided by the time management unit 501 in the storage controller 5 (Step S52).

The access timing control unit 504 confirms the state of the selected queue (Step S53). The state of queue includes three states: waiting for descriptor reading; waiting for data transfer; and waiting for descriptor writing. The waiting for descriptor reading is an initial state. In the case where a state of the selected queue is the waiting for descriptor reading, the access timing control unit 504 determines whether the reading of the descriptor is completed within the access-permitted period before the reading (Step S54).

When the reading of the descriptor is not completed within the access-permitted period (Step S54: No), processing is returned to Step S52. When the reading of the descriptor is completed within the access-permitted period (Step S54: Yes), the access timing control unit 504 instructs the data access unit 506 to read the transfer destination address of the read descriptor, issues a read command to the storage 3, and updates the state of queue in the data buffer unit 507 to the waiting for data transfer (Step S55).

The input data classification unit 510 classifies the read data into the queues in the data buffer unit 507 based on the namespaces (Step S56) and stores the read data in these queues (Step S57).

When the state of queue enters the waiting for data transfer, an access timing control unit 504 determines whether the writing of the read data is completed within the access-permitted period before the writing (Step S58). This determination may be executed using the data length and the size of DMA transfer.

When the writing of the read data is not completed (Step S58: No), processing is returned to Step S52. When the writing of the read data is completed (Step S58: Yes), the access timing control unit 504 instructs the data access unit 506 to read the read data from this queue in the data buffer unit 507 and write the read data in an area in the data storage unit 103*a* designated by the transfer destination address, and updates this state of queue in the data buffer unit 507 to the waiting for descriptor writing (Step S59).

When the state of the queue enters the waiting for descriptor writing, the access timing control unit 504 determines whether the writing of the descriptor is completed within the access-permitted period before the writing (Step S60).

When the writing of the descriptor is not completed (Step S60: No), processing is returned to Step S52. When the writing of the descriptor is completed (Step S60: Yes), the access timing control unit 504 instructs the data access unit 506 to write the length and the status to the read descriptor and delete an entry of the read data that has already been transferred from the queue, and updates this state of queue in the data buffer unit 507 to the waiting for descriptor reading (Step S61).

An area, in which the transfer destination address of the descriptor is cached, may be provided in each queue in the data buffer unit 507. When the transfer of the read data is completed, the task execution unit 203*a* reads the read data triggered by reading completion interrupt notification from the notification unit 505 and polling (Step S62). The notification from the notification unit 505 is transmitted to the task execution unit 203*a* via the virtual machine control unit 201 and the task control unit 202*a*.

By the above-mentioned data reading process of FIG. 17, the access by the data access unit 506 in the storage controller does not collide with access such as reading of a program and reading and writing of data by the task execution unit 203*a*. Thus, the data can be read without the collision with the memory access in the real-time process executed in the host processor 2.

Figure 18:
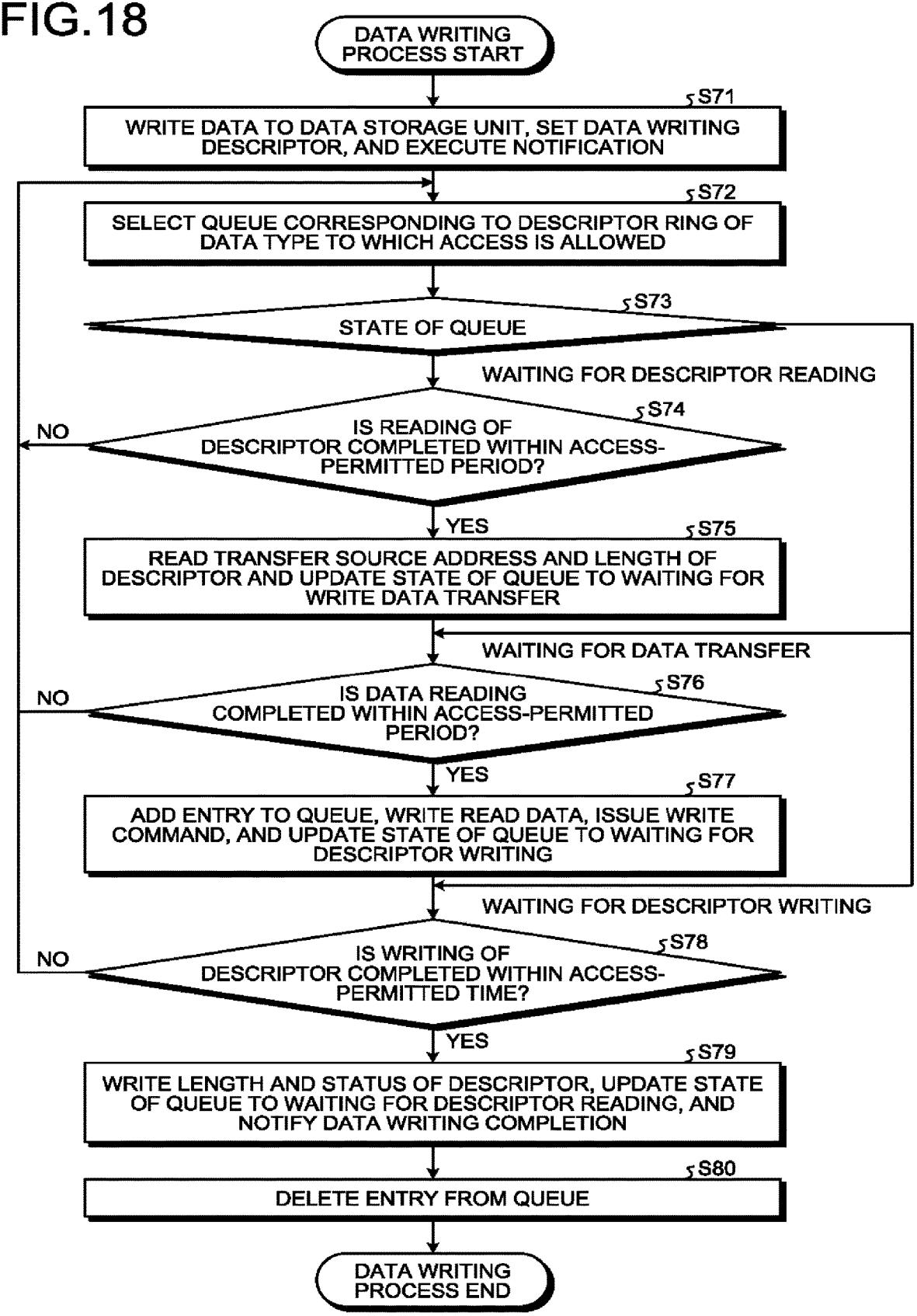
FIG. 18 is a flowchart illustrating an example of a data writing process of the second embodiment.

The following describes a flow of the data writing process with reference to FIG. 18.

Example of Data Writing Process

FIG. 18 is a flowchart illustrating an example of the data writing process of the second embodiment. The example of FIG. 18 gives the description with an example of the case of the virtual machine A. First, the task execution unit 203*a* writes write target data to the storage 3 in the data storage unit 103a, sets a transfer source address and a length to a write descriptor, and notifies the notification unit 505 of a write request of the write data via the task control unit 202a, the virtual machine control unit 201, or the like (Step S71).

Next, the access timing control unit 504 selects a descriptor, in which the write data is present, among the descriptors of the data types to which access are allowed, and selects a queue in the data buffer unit 407 corresponding to the descriptor ring (Step S72).

The access timing control unit 504 confirms the state of queue selected by the process of Step S72 (Step S73). The state of queue includes three states: waiting for descriptor reading; waiting for data transfer; and waiting for descriptor writing. The waiting for descriptor reading is an initial state.

When the state of the selected queue is the waiting for descriptor reading, the access timing control unit 504 determines whether the reading of the descriptor is completed within the access-permitted period before the reading (Step S74).

When the reading of the descriptor is not completed within the access-permitted period (Step S74: No), processing is returned to Step S72. When the reading of the descriptor is completed within the access-permitted period (Step S74: Yes), the access timing control unit 504 instructs the data access unit 506 to read the transfer source address and the length of the write descriptor, and updates this state of queue in the data buffer unit 507 to the waiting for data transfer (Step S75).

When the state of queue enters the waiting for data transfer, the access timing control unit 504 determines whether the reading of the write data is completed within the access-permitted period before the writing (Step S76). This determination may be executed using the data length and the size of DMA transfer.

When the reading of the write data is not completed (Step S76: No), processing is returned to Step S72. When the reading of the write data is completed (Step S76: Yes), the access timing control unit 504 adds an entry to store the write data in the queue in the data buffer unit 507, instructs the data access unit 506 to read the write data by the amount designated by the length from the area designated by the transfer source address in the data storage unit 103a, write the write data to the data buffer unit 507, and updates this state of queue in the data buffer unit 507 to the waiting for descriptor writing (Step S77).

When the state of queue enters the waiting for descriptor writing, the access timing control unit 504 determines whether the writing of the descriptor is completed within the access-permitted period before the writing (Step S78).

When the writing of the descriptor is not completed (Step S78: No), processing is returned to Step S72. When the writing of the descriptor is completed (Step S78: Yes), the access timing control unit 504 instructs the data access unit 506 to write the length and the status of the write descriptor, updates this state of queue of the data buffer unit 507 to the waiting for descriptor reading, and notifies data writing completion (Step S79). An area, in which the transfer source address of the descriptor is cached, may be provided in each queue in the data buffer unit 507. When the transfer of the write data is completed, a transmission completion interrupt notification is transmitted to the task execution unit 203a via the notification unit 505 through the virtual machine control unit 201 and the task control unit 202a.

The write data put in the queue in the data buffer unit 507 is written onto the storage 3 by the data input/output unit 509, and the entry that has already been written is deleted from the queue (Step S80).

By the above-mentioned data writing process of FIG. 18, the access by the data access unit 506 in the storage controller 5 does not collide with the access such as the reading of the program and data reading and writing by the task execution unit 203a. This allows data writing without the collision of the memory access in the real-time process executed by the host processor 2.

As described above, the processing apparatus 100-2 of the second embodiment can acquire the effects similar to those of the first embodiment even when operated as the recording device. Specifically, prohibition (or limitation) of the memory access from the storage controller 5 eliminates the need for considering the memory access collision with the host processor 2 and allows executing the real-time process. Moreover, this allows further facilitating the calculation of the worst delay to ensure being real-time.

Function blocks of the above-mentioned network interface controller 4 and storage controller 5 may be implemented by computer-readable programs causing a computer to function.

The program executed by the computer is recorded as a file in an installable format or an executable format in a computer-readable storage medium, such as a CD-ROM, a memory card, a CD-R, a Digital Versatile Disc (DVD), and the like and provided as a computer program product.

The program executed on the computer may be stored on the computer connected to a network such as the Internet and provided through downloading over the network. Alternatively, the program executed on the computer is not downloaded and may be provided over the network such as the Internet.

Additionally, the program executed by the computer may be preliminarily incorporated into a ROM or the like and provided.

The program executed by the computer has a module configuration including the function blocks which can be implemented by the program among the above-mentioned functional configuration (function blocks). Some or all of the above-mentioned respective function blocks may be implemented by hardware, such as an Integrated Circuit (IC), not being implemented by software.

In the case where the functions are implemented by using two or more processors, the respective processors may implement one function or may implement two or more functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing apparatus comprising:
   a memory; and
   a network interface controller that is coupled to the memory and is configured to execute data access that is at least one of data writing to the memory and data reading from the memory by Direct Memory Access (DMA), receive, from a host processor, access control information for controlling timing of the data access to be executed, manage time information on the host processor, and control the timing of the data access based on the received access control information, wherein the access control information includes information for controlling access based on predetermined processing schedule information on the host processor, and the predetermined processing schedule information includes execution periods being specified according to the time information on the host processor, time information on the network interface controller is synchronized with the time information on the host processor, and the network interface controller is configured to limit or prohibit the data access based on the access control information and the data access time based on at least one of a length of the data and a transfer size by the DMA.

2. The apparatus according to claim 1, wherein the network interface controller is configured to access a descriptor that manages DMA transfer, and further control timing of access to the descriptor.

3. The apparatus according to claim 1, wherein the access control information includes a real-time task process execution period, which is specified according to the time information on the host processor, and the network interface controller is configured to limit or prohibit the data access when the data access is not completed before the real-time task process execution period.

4. The apparatus according to claim 1, wherein the access control information includes an access-limited period, which is specified according to the time information on the host processor, and the network interface controller is configured to limit the data access when the data access is not completed before the access-limited period.

5. The apparatus according to claim 1, wherein the access control information includes at least one of an access-permitted period and an access-prohibited period, each being specified according to the time information on the host processor, and the network interface controller is configured to prohibit the data access when the data access is not completed before the access-prohibited period.

6. The apparatus according to claim 5, wherein the access control information includes information for controlling at least one of the access-permitted period and the access-prohibited period for each type of data, and the network interface controller is configured to identify the type of the data and control the timing of the data access for each type of the data based on the access control information.

7. The apparatus according to claim 6, wherein the type of the data is classified according to a Media Access Control (MAC) address included in the data.

8. The apparatus according to claim 7, wherein the type of the data is further classified according to a priority of the data.

9. The apparatus according to claim 6, wherein the type of the data is classified according to a namespace included in the data.

10. The apparatus according to claim 1, wherein the access control information includes information for controlling access based on predetermined processing schedule information of a virtual machine executed on the host processor.

11. A processing method implemented by a computer, the method comprising:

executing, by a network interface controller, data access that is at least one of data writing to a memory and data reading from the memory by Direct Memory Access (DMA);

receiving, by the network interface controller and from a host processor, access control information for controlling timing of the data access to be executed;

managing, by the network interface controller, time information on the host processor; and controlling, by the network interface controller, the timing of the data access based on the received access control information, wherein the access control information includes information for controlling access based on predetermined processing schedule information on the host processor, and the predetermined processing schedule information includes execution periods being specified according to the time information on the host processor, time information on the network interface controller is synchronized with the time information on the host processor, and the method comprises limiting or prohibiting, by the network interface controller, the data access based on the access control information and the data access time based on at least one of a length of the data and a transfer size by the DMA.

12. A computer program product comprising a non-transitory computer-readable recording medium on which an executable program is recorded, the program instructing a computer to:

execute, by way of a network interface controller, data access that is at least one of data writing to a memory and data reading from the memory by Direct Memory Access (DMA);

receive, by way of the network interface controller and from a host processor, access control information for controlling timing of the data access to be executed;

manage, by way of the network interface controller, time information on the host processor, and control, by way of the network interface controller, the timing of the data access based on the received access control information, wherein the access control information includes information for controlling access based on predetermined processing schedule information on the host processor, and the predetermined processing schedule information includes execution periods being specified according to the time information on the host processor, time information on the network interface controller is synchronized with the time information on the host processor, and the program instructs the computer to limit or prohibit, by way of the network interface controller, the data access based on the access control information and the data access time based on at least one of a length of the data and a transfer size by the DMA.

13. A processing apparatus comprising:
a memory; and
a network interface controller that is coupled to the memory and is configured to
   execute data access that is at least one of data writing to the memory and data reading from the memory,
   receive, from a host processor, access control information for controlling timing of the data access to be executed,
   manage time information on the host processor, and
   control the timing of the data access based on the received access control information, wherein
   the access control information includes information for controlling access based on predetermined processing schedule information on the host processor, and the predetermined processing schedule information includes execution periods being specified according to the time information on the host processor,
   time information on the network interface controller is synchronized with the time information on the host processor, and
   the network interface controller is configured to limit or prohibit the data access based on the access control information, wherein
the access control information includes at least one of an access-permitted period and an access-prohibited period, each being specified according to the time information on the host processor, and includes information for controlling at least one of the access-permitted period and the access-prohibited period for each type of data,
the network interface controller is configured to prohibit the data access during the access-prohibited period, identify the type of the data, and control the timing of the data access for each type of the data based on the access control information.

14. A processing method implemented by a computer, the method comprising:
executing, by a network interface controller, data access that is at least one of data writing to a memory and data reading from the memory;
receiving, by the network interface controller and from a host processor, access control information for controlling timing of the data access to be executed;
managing, by the network interface controller, time information on the host processor;
controlling, by the network interface controller, the timing of the data access based on the received access control information, the access control information including information for controlling access based on predetermined processing schedule information on the host processor, the predetermined processing schedule information including execution periods being specified according to the time information on the host processor, time information on the network interface controller being synchronized with the time information on the host processor;
limiting or prohibiting, by the network interface controller, the data access based on the access control information, the access control information including at least one of an access-permitted period and an access-prohibited period, each being specified according to the time information on the host processor, the access control information including information for controlling at least one of the access-permitted period and the access-prohibited period for each type of data; and
by the network interface controller, prohibiting the data access during the access-prohibited period, identifying the type of the data, and controlling the timing of the data access for each type of the data based on the access control information.

15. A computer program product comprising a non-transitory computer-readable recording medium on which an executable program is recorded, the program instructing a computer to:
execute, by way of a network interface controller, data access that is at least one of data writing to a memory and data reading from the memory;
receive, by way of the network interface controller and from a host processor, access control information for controlling timing of the data access to be executed;
manage, by way of the network interface controller, time information on the host processor;
control, by way of the network interface controller, the timing of the data access based on the received access control information, the access control information including information for controlling access based on predetermined processing schedule information on the host processor, the predetermined processing schedule information including execution periods being specified according to the time information on the host processor, and time information on the network interface controller being synchronized with the time information on the host processor;
limit or prohibit, by way of the network interface controller, the data access based on the access control information, the access control information including at least one of an access-permitted period and an access-prohibited period, each being specified according to the time information on the host processor, the access control information including information for controlling at least one of the access-permitted period and the access-prohibited period for each type of data; and
by way of the network interface controller, prohibit the data access during the access-prohibited period, identify the type of the data, and control the timing of the data access for each type of the data based on the access control information.

* * * * *